(12) United States Patent
Teerlink

(10) Patent No.: US 9,390,098 B2
(45) Date of Patent: Jul. 12, 2016

(54) FAST APPROXIMATION TO OPTIMAL COMPRESSION OF DIGITAL DATA

(75) Inventor: Craig N. Teerlink, Cedar Hills, UT (US)

(73) Assignee: NOVELL, INC., Provo, UT (US)

( * ) Notice: Subject to any disclaimer, the term of this patent is extended or adjusted under 35 U.S.C. 154(b) by 1026 days.

(21) Appl. No.: 12/575,767

(22) Filed: Oct. 8, 2009

(65) Prior Publication Data

US 2011/0016097 A1 Jan. 20, 2011

Related U.S. Application Data

(60) Provisional application No. 61/236,571, filed on Aug. 25, 2009, provisional application No. 61/271,079, filed on Jul. 16, 2009.

(51) Int. Cl.
*G06F 7/00* (2006.01)
*G06F 17/30* (2006.01)
*H04L 9/08* (2006.01)
*G06T 9/00* (2006.01)
*H04N 19/00* (2014.01)

(52) U.S. Cl.
CPC .... *G06F 17/30153* (2013.01); *G06F 17/30598* (2013.01); *G06T 9/005* (2013.01); *H04L 9/0894* (2013.01); *H04N 19/00* (2013.01); *H04L 2209/30* (2013.01); *H04L 2209/34* (2013.01); *Y10S 707/972* (2013.01)

(58) Field of Classification Search
USPC ................................ 707/999.104, 836, 693
See application file for complete search history.

(56) References Cited

U.S. PATENT DOCUMENTS

| 5,109,433 | A | * | 4/1992 | Notenboom ........ G06F 17/3061 |
| | | | | 358/1.9 |
| 5,561,421 | A | | 10/1996 | Smith et al. |
| 5,590,317 | A | * | 12/1996 | Iguchi et al. |
| 5,710,719 | A | | 1/1998 | Houle |
| 5,838,963 | A | | 11/1998 | Griffiths |
| 6,108,619 | A | | 8/2000 | Carter et al. |
| 6,154,213 | A | | 11/2000 | Rennison et al. |
| 6,263,422 | B1 | | 7/2001 | Wise et al. |

(Continued)

OTHER PUBLICATIONS http://www.cs.cmu.edu/~gbd/papers/davis05fog.pdf "Clearing the FOG: Fuzzy, Overlapping Groups for Social Networks"; George B. Davis and Kathleen M. Carley Undated 45 Pages.

(Continued)

*Primary Examiner* — Usmaan Saeed
*Assistant Examiner* — Eliyah S Harper
(74) *Attorney, Agent, or Firm* — King & Schickli, PLLC

(57) ABSTRACT

A "fast approximation" of compression of current data involves using information obtained from an earlier compression of similar data. It overcomes the iterative process of discovering a unique set of optimal symbols. Representatively, a dictionary of symbols corresponding to original data from an earlier compressed file is extracted. Original bits are then obtained from the symbols. Sequences of the original bits are identified in the current data of a current file under consideration. A new bit stream for the current file is created from the original bits and according to the symbols they represent. Every occurrence of the symbols is counted in the new bit stream and a path-weighted Huffman tree is created from the counted occurrences. A coding from the Huffman tree ensues, along with an end-of-file marker. The latter is stored in a new compression file, including the dictionary earlier extracted from the earlier compressed file.

2 Claims, 94 Drawing Sheets

| Term | Definition |
|---|---|
| Alphabet | The set of all possible symbols currently in use. |
| Atomic symbols | The symbols 0 and 1, which are based on the raw 0 and 1 bit values. All subsequently defined symbols represent tuples that are based on symbols 0 and 1. |
| Character | A symbol that appears in the data stream. |
| Compressed file size | The number of bits that are required to store the encoded data stream, the dictionary, and the symbol-encoding information. |
| Data stream | A sequential stream of characters. The terms data stream and text are synonymous in this document. |
| Dictionary | A collection of information regarding all symbols (the alphabet). |
| Encoded data stream | A data stream of Huffman encoded characters. |
| Pass | The performance of one iteration of the compression procedure applied to the current data stream. |
| Symbol | A unit of information. The information that is represented by a symbol can be from 1 to N binary bits in length. |
| Symbol-encoding information | Symbols in the alphabet are digitally encoded to reduce the amount of space required to store or transmit them electronically. The encoding information is stored and used to decompress the data later. A well understood method of minimizing the space required to store a series of characters is the use of minimum weighted path length trees, as given by David Huffman (D. E. Knuth, *The Art of Computer Programming*, 1973, vol. 1, p. 402). |
| Text | A sequential stream of characters. The terms data stream and text are synonymous in this document. |
| Tuple | Two adjoining characters in the data stream or text. The order of the appearance of characters in the tuple is designated as "first" and "last". The notation for tuples is "first>last" to show the order of appearance in the pair of characters and to avoid confusion of the tuples with real numbers. For example, a tuple of symbol 1 followed by symbol 0 is written as 1>0. In each pass through the data stream, the most highly occurring tuple is determined. A new symbol is created to represent the tuple in the data stream. The symbol stands for and replaces all occurrences of the tuple in the data stream. |

(56) References Cited

U.S. PATENT DOCUMENTS

| | | | |
|---|---|---|---|
| 6,298,174 B1 | 10/2001 | Lantrip et al. | |
| 6,424,971 B1 | 7/2002 | Kreulen et al. | |
| 6,434,561 B1* | 8/2002 | Durst, Jr. | H04N 1/33323 |
| 6,546,146 B1 | 4/2003 | Hollinger et al. | |
| 6,667,700 B1 | 12/2003 | McCanne et al. | |
| 6,701,318 B2 | 3/2004 | Fox et al. | |
| 6,906,645 B2 | 6/2005 | Jones et al. | |
| 6,919,826 B1 | 7/2005 | Peacock | |
| 6,941,312 B1* | 9/2005 | Hoffman | H03M 7/30 |
| 7,026,960 B2 | 4/2006 | Lee et al. | |
| 7,026,962 B1 | 4/2006 | Emami et al. | |
| 7,031,910 B2 | 4/2006 | Eisele | |
| 7,152,031 B1 | 12/2006 | Jensen et al. | |
| 7,197,451 B1 | 3/2007 | Carter et al. | |
| 7,280,920 B1 | 10/2007 | Whiteside et al. | |
| 7,286,977 B1 | 10/2007 | Carter et al. | |
| 7,289,985 B2 | 10/2007 | Zeng et al. | |
| 7,305,389 B2 | 12/2007 | Zeng et al. | |
| 7,386,560 B2 | 6/2008 | Tan | |
| 7,389,225 B1 | 6/2008 | Jensen et al. | |
| 7,417,568 B2 | 8/2008 | Fallon et al. | |
| 7,475,008 B2 | 1/2009 | Jensen et al. | |
| 7,499,923 B2 | 3/2009 | Kawatani | |
| 7,502,785 B2 | 3/2009 | Chen et al. | |
| 7,529,735 B2 | 5/2009 | Zhang et al. | |
| 7,562,011 B2 | 7/2009 | Carter et al. | |
| 7,624,130 B2 | 11/2009 | Chen et al. | |
| 7,634,471 B2 | 12/2009 | Chen et al. | |
| 7,636,691 B2* | 12/2009 | Maari | G06F 21/10 380/200 |
| 7,650,320 B2 | 1/2010 | Nakano | |
| 7,653,530 B2 | 1/2010 | Carter et al. | |
| RE41,152 E | 2/2010 | Reynar et al. | |
| 7,737,870 B1 | 6/2010 | Wang | |
| 7,809,704 B2 | 10/2010 | Surendran et al. | |
| 2001/0016007 A1* | 8/2001 | Wu | G06F 17/30811 375/240.16 |
| 2002/0042793 A1 | 4/2002 | Choi | |
| 2002/0113818 A1 | 8/2002 | Tsuda | |
| 2002/0169770 A1 | 11/2002 | Kim et al. | |
| 2002/0191224 A1 | 12/2002 | Yagishita et al. | |
| 2003/0004938 A1 | 1/2003 | Lawder | |
| 2003/0006918 A1 | 1/2003 | Barnett | |
| 2003/0078899 A1 | 4/2003 | Shanahan | |
| 2003/0145014 A1 | 7/2003 | Minch | |
| 2003/0149727 A1 | 8/2003 | Jaschek et al. | |
| 2003/0206125 A1 | 11/2003 | Abdat | |
| 2003/0212695 A1 | 11/2003 | Rissanen | |
| 2003/0220922 A1 | 11/2003 | Yamamoto et al. | |
| 2004/0003264 A1 | 1/2004 | Zeman et al. | |
| 2004/0156613 A1 | 8/2004 | Hempel et al. | |
| 2004/0230577 A1 | 11/2004 | Kawatani | |
| 2005/0008227 A1 | 1/2005 | Duan et al. | |
| 2005/0114290 A1 | 5/2005 | Borthakur et al. | |
| 2006/0155662 A1 | 7/2006 | Murakami et al. | |
| 2006/0190465 A1 | 8/2006 | Nakano | |
| 2006/0193387 A1* | 8/2006 | Wu | G06F 17/30811 375/240.16 |
| 2006/0285760 A1 | 12/2006 | Malvar | |
| 2006/0288029 A1 | 12/2006 | Murakami et al. | |
| 2006/0294059 A1* | 12/2006 | Chamberlain | G06F 17/30982 |
| 2007/0008191 A1 | 1/2007 | Archbold et al. | |
| 2007/0043718 A1 | 2/2007 | Arellanes et al. | |
| 2007/0057825 A1 | 3/2007 | De Martin et al. | |
| 2007/0083368 A1 | 4/2007 | Handley | |
| 2007/0168320 A1 | 7/2007 | Borthakur et al. | |
| 2008/0016246 A1 | 1/2008 | Singh | |
| 2008/0122664 A1 | 5/2008 | Chang et al. | |
| 2008/0126858 A1 | 5/2008 | Barras | |
| 2008/0147646 A1 | 6/2008 | Jaschek et al. | |
| 2008/0152235 A1 | 6/2008 | Bashyam et al. | |
| 2008/0154928 A1 | 6/2008 | Bashyam et al. | |
| 2008/0180284 A1 | 7/2008 | Luby | |
| 2008/0228795 A1* | 9/2008 | Lomet | G06F 17/30551 |
| 2008/0243518 A1 | 10/2008 | Oraevsky et al. | |
| 2009/0018801 A1 | 1/2009 | Gladkova et al. | |
| 2009/0018996 A1 | 1/2009 | Hunt et al. | |
| 2009/0046864 A1 | 2/2009 | Mahabub et al. | |
| 2009/0144561 A1 | 6/2009 | Davidson et al. | |
| 2009/0207999 A1* | 8/2009 | Yonemura | H04L 9/08 380/30 |
| 2009/0316200 A1 | 12/2009 | Kubota et al. | |
| 2009/0319467 A1 | 12/2009 | Berg et al. | |
| 2010/0057798 A1 | 3/2010 | Zhang et al. | |
| 2010/0138216 A1 | 6/2010 | Tanev | |
| 2010/0169285 A1 | 7/2010 | Bansal et al. | |
| 2010/0259631 A1 | 10/2010 | Sugita | |
| 2011/0016098 A1 | 1/2011 | Teerlink | |
| 2011/0016101 A1 | 1/2011 | Isaacson et al. | |
| 2011/0016124 A1 | 1/2011 | Isaacson et al. | |
| 2011/0016135 A1 | 1/2011 | Teerlink | |
| 2011/0016136 A1 | 1/2011 | Isaacson et al. | |
| 2011/0016138 A1 | 1/2011 | Teerlink | |
| 2011/0047156 A1 | 2/2011 | Knight et al. | |
| 2011/0252063 A1 | 10/2011 | Isaacson et al. | |

OTHER PUBLICATIONS http://figment.csee.usf.edu/~sfefilat/data/papers/TuAT1.4.pdf "Beyond Partitions: Allowing Overlapping Groups in Pairwise Clustering" Andrea Torsello, Samuel Rota Bul'o, and Marcello Pelillo Copyright 2008 4 Pages.

http://www.nature.com/nature/journal/v435/n7043/extref/nature03607-s1.pdf "Uncovering the overlapping community structure of complex networks in nature and society" Gergely Palla, Imre Derényi, Illés Farkas & Tamás Vicsek Undated 12 Pages.

http://74.125.47.132/starch?q=cache:http://fuzzy.lau.dtu.dk/download/ddfm.ppt "Data-driven Fuzzy Modeling" U. Kaymak Oct. 1, 2001 49 Pages.

http://www.cs.washington.edu/homes/nchemica/publications/quals.pdf "Grammar-based compression of DNA sequences" Nova Chemiavsky end Richard Ladner Undated 14 Pages.

http://sequitur.info/jair/ "Identifying Hierarchical Structure in Sequences: A Linear-Time Algorithm" Craig G. Nevill-Manning and Ian H. Witten Printed Oct. 27, 2008 16 Pages.

http://en.wikipedia.org/wiki/Sequitur_algorithm "Sequitur algorithm" Last modified on Oct. 2, 2008 2 Pages.

http://arxiv.org/ftp/arxiv/papers/0801/0801.4024.pdf "Set-based Complexity and Biological Information" David J. Galas, Matti Nykter, Gregory W. Carter, Nathan D. Price and Ilya Shmulevich Jan. 11, 2008 30 Pages.

Pluempitiwriyawej, et al.; "Element matching across data-oriented XML sources using a multi-strategy clustering model"; Data & Knowledge Engineering 28 (2004) pp. 297-333.

Stephen O'Hara et al.; "Agent-based reduction of information density (ARID) demonstration International Conference of Autonomous Agents"; Proceedings of the 6th international joint conference of Autonomous Agents and multiagent systems; Published 2007; Abstract printed from Portal.com Feb. 1, 2010; 2 pages.

Hrishikesh Aradhye, et al.; "Recognizing patterns in information retrieval: a memory-based classifier for inferring relevancy"; Artificial Intelligence in Engineering; vol. 12, Issue 1-2, Jan.-Apr. 1998, pp. 99-105.

G. Apostolopoulos, et al; "Design, implementation and performance of a content-based switch"; Siara Syst., Mountain View, CA; www.ieeexplore.ieee.org; printed Feb. 9, 2010; 1 page.

European Search Report for European Application No. 11157556.9 dated Jan. 24, 2012.

Maria Riaz, et al.; "Incorporating Semantics-Based Search and Policy-Based Access Control Mechanism in Context Service Delivery"; Fourth Annual ACIS International Conference on Computer and Information Science (ICIS'05), 2005; pp. 175-180.

David K. Gifford, at al.; "Semantic File Systems"; 13th ACM Symposium on Operating Systems Principles, Oct. 1991.

Timothy Khouri; "Making Your Own Semantic Controls"; http://www.singingeels.com/Articles/Making_Your_Own_Semantic_Controls.aspx; Apr 27, 2007.

(56) References Cited

OTHER PUBLICATIONS

Yague, M.I., Mana, et al.; "Semantic Access Control"; Second Authentication and Authorisation; Nov. 20-21, 2003; Magala, Spain; http://www.terena.orgiactivities/tf-aace/AAworkshop/ppt/SemanticAccessControl.pdf.

Patrick J. Lynch and Sarah Horton; "Semantic Content Markup" Web Style Guide 3rd Edition; Copyright 2008-2009 Lynch and Horton; http://webstyleguide.com/wsg3/5-site-structure/2-semantic-markup.html.

"Understanding and Selecting a DLP Solution: Part 2, Content Awareness"; Posted at Thursday Sep. 13, 2007 7:29 am; http://securosis.com/blog/understanding-and-selecting-a-dlp-solution-part-2-content-awareness.

Yahoo turns to semantic web for improving search; Saturday, Mar. 15, 2008 3:53:42 AM by admin 2 Pages; http://www.thaindian.com/newsportal/south-asia/yahoo-turns-to-semantic-web-for-improving-search_10077695.html.

Li Ding, et al; "How the Semantic Web is Being Used:An Analysis of FOAF Documents" Proceedings of the 38th International Conference on System Sciences, pp. 1-10, 2005.

Lei Li, et al.; "A software Framework for Matchmaking based on semantic web technology"; WWW '03 Proceedings of the 12th international conference on World Wide Web;pp. 331-339; ACM, © 2003.

Jesper Larsson, et al.; "Off-line Dictionary-Based Compression"; 1999; IEEE, Data Compression Conference; vol. 88, Edition No. 11, pp. 1722-1732.

Office Action for U.S. Appl. No. 12/568,190 dated Nov. 23, 2011.
Final Office Action for U.S. Appl. No. 12/684,313 dated Mar. 5, 2012.
Office Action for U.S. Appl. No. 12/684,313 dated Oct. 19, 2011.
Office Action for U.S. Appl. No. 12/649,584 dated Nov. 14, 2011.
Office Action for U.S. Appl. No. 12/637,807 dated Sep. 26, 2011.
Office Action for U.S. Appl. No. 12/616,306 dated Oct. 3, 2011.
Office Action for U.S. Appl. No. 12/759,414 dated Dec. 30, 2011.
Office Action for U.S. Appl. No. 12/759,414 dated Jul. 11, 2011.
Office Action for U.S. Appl. No. 12/720,897 dated Nov. 30, 2011.
Final Office Action for U.S. Appl. No. 12/616,306 dated Mar. 22, 2012.
Office Action for U.S. Appl. No. 12/648,542 dated Mar. 28, 2012.
Final Office Action for U.S. Appl. No. 12/568,190 dated Mar. 31, 2012.
Final Office Action for U.S. Appl. No. 12/649,688 dated Feb. 29, 2012.
Office Action for U.S. Appl. No. 12/649,688 dated Nov. 14, 2011.
Manber; "A Text Compression Scheme that Allows Fast Searching Directly in the Compressed File"; Apr. 1997; ACM Transactions on Information Systems, vol. 15, No. 2, pp. 124-136.
Nakamura et al;"Data Compression by Concatenations of Symbol Pairs"; In Proceedings of the IEEE Symposium Theory and Its Applications;1996; (Victoria, BC), pp. 496-499.
Cilibrasi et al,; "Clustering by Compression"; Apr. 2005; Information Theory; IEEE, vol. 51, No. 4, pp. 1523-1545.
Office Action for U.S. Appl. No. 12/568,190 dated Sep. 20, 2012.
Final Office Action for U.S. Appl. No. 12/649,584 dated Jun. 14, 2012.
Office Action for U.S. Appl. No. 12/575,652 dated Jun. 28, 2012.
Office Action for U.S. Appl. No. 12/616,306 dated Jul. 12, 2012.
Final Office Action for U.S. Appl. No. 12/637,807 dated Jul. 24, 2012.
Final Office Action for U.S. Appl. No. 12/648,542 dated Oct. 5, 2012.

\* cited by examiner

| Term | Definition |
|---|---|
| Alphabet | The set of all possible symbols currently in use. |
| Atomic symbols | The symbols 0 and 1, which are based on the raw 0 and 1 bit values. All subsequently defined symbols represent tuples that are based on symbols 0 and 1. |
| Character | A symbol that appears in the data stream. |
| Compressed file size | The number of bits that are required to store the encoded data stream, the dictionary, and the symbol-encoding information. |
| Data stream | A sequential stream of characters.<br>The terms data stream and text are synonymous in this document. |
| Dictionary | A collection of information regarding all symbols (the alphabet). |
| Encoded data stream | A data stream of Huffman encoded characters. |
| Pass | The performance of one iteration of the compression procedure applied to the current data stream. |
| Symbol | A unit of information. The information that is represented by a symbol can be from 1 to N binary bits in length. |
| Symbol-encoding information | Symbols in the alphabet are digitally encoded to reduce the amount of space required to store or transmit them electronically. The encoding information is stored and used to decompress the data later.<br>A well understood method of minimizing the space required to store a series of characters is the use of minimum weighted path length trees, as given by David Huffman (D. E. Knuth, *The Art of Computer Programming*, 1973, vol. 1, p. 402). |
| Text | A sequential stream of characters.<br>The terms data stream and text are synonymous in this document. |
| Tuple | Two adjoining characters in the data stream or text. The order of the appearance of characters in the tuple is designated as "first" and "last". The notation for tuples is "first>last" to show the order of appearance in the pair of characters and to avoid confusion of the tuples with real numbers. For example, a tuple of symbol 1 followed by symbol 0 is written as 1>0.<br>In each pass through the data stream, the most highly occurring tuple is determined. A new symbol is created to represent the tuple in the data stream. The symbol stands for and replaces all occurrences of the tuple in the data stream. |

FIG. 1

| Tuple Count | First | |
|---|---|---|
| Last | 0 | 1 |
| 0 | 2 | 2 |
| 1 | 3 | 1 |

FIG. 4

| Tuple | $A^2$ | $B^2$ | $C^2$ | Hypotenuse |
|---|---|---|---|---|
| 1>5 | 1 | 25 | 26 | 5.1 |
| 3>7 | 9 | 49 | 58 | 7.6 |
| 4>4 | 16 | 16 | 32 | 5.7 |

| Tuple Array | First | | | | | | | |
|---|---|---|---|---|---|---|---|---|
| Last | 0 | 1 | 2 | 3 | 4 | 5 | 6 | 7 |
| 0 | 0>0 | 1>0 | 2>0 | 3>0 | 4>0 | 5>0 | 6>0 | 7>0 |
| 1 | 0>1 | 1>1 | 2>1 | 3>1 | 4>1 | 5>1 | 6>1 | 7>1 |
| 2 | 0>2 | 1>2 | 2>2 | 3>2 | 4>2 | 5>2 | 6>2 | 7>2 |
| 3 | 0>3 | 1>3 | 2>3 | 3>3 | 4>3 | 5>3 | 6>3 | 7>3 |
| 4 | 0>4 | 1>4 | 2>4 | 3>4 | 4>4 | 5>4 | 6>4 | 7>4 |
| 5 | 0>5 | 1>5 | 2>5 | 3>5 | 4>5 | 5>5 | 6>5 | 7>5 |
| 6 | 0>6 | 1>6 | 2>6 | 3>6 | 4>6 | 5>6 | 6>6 | 7>6 |
| 7 | 0>7 | 1>7 | 2>7 | 3>7 | 4>7 | 5>7 | 6>7 | 7>7 |

FIG. 7

| Tuple Array | First | |
|---|---|---|
| Last | 0 | 1 |
| 0 | 0>0 | 1>0 |
| 1 | 0>1 | 1>1 |

| Symbol | Count |
|--------|------:|
| 0 | 240 |
| 1 | 144 |
| Total | 384 |

| Symbol | Count |
|---|---|
| 0 | 144 |
| 1 | 48 |
| 2 | 96 |
| Total | 288 |

| Symbol | Huffman Code | Bit Length | Symbol Count | Total Bits |
|---|---|---|---|---|
| 0 | 0 | 1 | 144 | 144 |
| 1 | 101 | 3 | 48 | 144 |
| 2 | 11 | 2 | 96 | 192 |
| EOF | 100 | 3 | 1 | 3 |
| | | | Total Bits for Data | 483 |

FIG. 17

| Compressed File Size | Original Bit Count | Current Bit Count |
|---|---:|---:|
| Data Length | 384 | 483 |
| Overhead | 0 | 25 |
| Total Bits Needed | 384 | 508 |
| Compression Ratio | | 132% |

| Tuple Array | First | | |
|---|---|---|---|
| Last | 0 | 1 | 2 |
| 0 | 0>0 | 1>0 | 2>0 |
| 1 | 0>1 | 1>1 | 2>1 |
| 2 | 0>2 | 1>2 | 2>2 |

| Tuple Count | First | | |
|---|---|---|---|
| Last | 0 | 1 | 2 |
| 0 | 48 | 0 | 56 |
| 1 | 9 | 0 | 39 |
| 2 | 48 | 48 | 0 |

| Alphabet | Definition | |
|---|---|---|
| | First | Last |
| 0 | 0 | - |
| 1 | 1 | - |
| 2 | 1 | 0 |
| 3 | 2 | 0 |

| Symbol | Huffman Code | Bit Length | Symbol Count | Total Bits |
|---|---|---|---|---|
| 0 | 11 | 2 | 88 | 176 |
| 1 | 01 | 2 | 48 | 96 |
| 2 | 001 | 3 | 40 | 120 |
| 3 | 10 | 2 | 56 | 112 |
| EOF | 000 | 3 | 1 | 3 |
| | | | Total Bits for Data | 507 |

FIG. 25

| Compressed File Size | Original | Current |
|---|---|---|
| Data Length | 384 | 507 |
| Overhead | 0 | 38 |
| Total Bits Needed | 384 | 545 |
| Compression Ratio | | 141% |

| Tuple Array | First | | | |
|---|---|---|---|---|
| Last | 0 | 1 | 2 | 3 |
| 0 | 0>0 | 1>0 | 2>0 | 3>0 |
| 1 | 0>1 | 1>1 | 2>1 | 3>1 |
| 2 | 0>2 | 1>2 | 2>2 | 3>2 |
| 3 | 0>3 | 1>3 | 2>3 | 3>3 |

| Alphabet | Definition | |
|---|---|---|
| | First | Last |
| 0 | 0 | - |
| 1 | 1 | - |
| 2 | 1 | 0 |
| 3 | 2 | 0 |
| 4 | 1 | 3 |

| Symbol | Symbol Count | Huffman Code |
|---|---|---|
| 0 | 88 | 0 |
| 1 | 0 | - |
| 2 | 40 | 111 |
| 3 | 8 | 1101 |
| 4 | 48 | 10 |
| EOF | 1 | 1100 |

FIG. 32

| Compressed File Size | Original | Current |
|---|---|---|
| Data Length | 384 | 340 |
| Overhead | 0 | 42 |
| Total Bits Needed | 384 | 382 |
| Compression Ratio | | 99% |

| Tuple Array | First | | | | |
|---|---|---|---|---|---|
| Last | 0 | 1 | 2 | 3 | 4 |
| 0 | 0>0 | 1>0 | 2>0 | 3>0 | 4>0 |
| 1 | 0>1 | 1>1 | 2>1 | 3>1 | 4>1 |
| 2 | 0>2 | 1>2 | 2>2 | 3>2 | 4>2 |
| 3 | 0>3 | 1>3 | 2>3 | 3>3 | 4>3 |
| 4 | 0>4 | 1>4 | 2>4 | 3>4 | 4>4 |

| Tuple Count | First | | | | |
|---|---|---|---|---|---|
| Last | 0 | 1 | 2 | 3 | 4 |
| 0 | 39 | 0 | 0 | 0 | 48 |
| 1 | 0 | 0 | 0 | 0 | 0 |
| 2 | 40 | 0 | 0 | 0 | 0 |
| 3 | 8 | 0 | 0 | 0 | 0 |
| 4 | 1 | 0 | 39 | 8 | 0 |

| Symbol | Symbol Count | Huffman Code |
|---|---|---|
| 0 | 40 | 10 |
| 1 | 0 | - |
| 2 | 40 | 01 |
| 3 | 8 | 001 |
| 4 | 0 | - |
| 5 | 48 | 11 |
| EOF | 1 | 000 |

| Symbol | Huffman Code | Bit Length | Symbol Count | Total Bits |
|---|---|---|---|---|
| 0 | 10 | 2 | 40 | 80 |
| 2 | 01 | 2 | 40 | 80 |
| 3 | 001 | 3 | 8 | 24 |
| 5 | 11 | 2 | 48 | 96 |
| EOF | 000 | 3 | 1 | 3 |
| | | | Total Bits for Data | 283 |

| Compression Overhead | Current |
|---|---|
| File Information | 8 |
| Dictionary Length | 16 |
| Tree Length | 24 |
| Total Overhead | 48 |

| Compressed File Size | Original | Current |
|---|---|---|
| Data Length | 384 | 283 |
| Overhead | 0 | 48 |
| Total Bits Needed | 384 | 331 |
| Compression Ratio | | 86% |

| Tuple Array | First | | | | | |
| --- | --- | --- | --- | --- | --- | --- |
| Last | 0 | 1 | 2 | 3 | 4 | 5 |
| 0 | 0>0 | 1>0 | 2>0 | 3>0 | 4>0 | 5>0 |
| 1 | 0>1 | 1>1 | 2>1 | 3>1 | 4>1 | 5>1 |
| 2 | 0>2 | 1>2 | 2>2 | 3>2 | 4>2 | 5>2 |
| 3 | 0>3 | 1>3 | 2>3 | 3>3 | 4>3 | 5>3 |
| 4 | 0>4 | 1>4 | 2>4 | 3>4 | 4>4 | 5>4 |
| 5 | 0>5 | 1>5 | 2>5 | 3>5 | 4>5 | 5>5 |

| Tuple Count | First | | | | | |
|---|---|---|---|---|---|---|
| Last | 0 | 1 | 2 | 3 | 4 | 5 |
| 0 | 0 | 0 | 0 | 0 | 0 | 39 |
| 1 | 0 | 0 | 0 | 0 | 0 | 0 |
| 2 | 39 | 0 | 0 | 0 | 0 | 1 |
| 3 | 0 | 0 | 0 | 0 | 0 | 8 |
| 4 | 0 | 0 | 0 | 0 | 0 | 0 |
| 5 | 1 | 0 | 39 | 8 | 0 | 0 |

| Alphabet | Definition | |
|---|---|---|
| | First | Last |
| 0 | 0 | - |
| 1 | 1 | - |
| 2 | 1 | 0 |
| 3 | 2 | 0 |
| 4 | 1 | 3 |
| 5 | 4 | 0 |
| 6 | 2 | 5 |

| Symbol | Symbol Count | Huffman Code |
|---|---|---|
| 0 | 40 | 0 |
| 1 | 0 | - |
| 2 | 1 | 10100 |
| 3 | 8 | 1011 |
| 4 | 0 | - |
| 5 | 9 | 100 |
| 6 | 39 | 11 |
| EOF | 1 | 10101 |

| Compressed File Size | Original | Current |
|---|---|---|
| Data Length | 384 | 187 |
| Overhead | 0 | 59 |
| Total Bits Needed | 384 | 246 |
| Compression Ratio | | 64% |

| Tuple Array | First | | | | | | |
|---|---|---|---|---|---|---|---|
| Last | 0 | 1 | 2 | 3 | 4 | 5 | 6 |
| 0 | 0>0 | 1>0 | 2>0 | 3>0 | 4>0 | 5>0 | 6>0 |
| 1 | 0>1 | 1>1 | 2>1 | 3>1 | 4>1 | 5>1 | 6>1 |
| 2 | 0>2 | 1>2 | 2>2 | 3>2 | 4>2 | 5>2 | 6>2 |
| 3 | 0>3 | 1>3 | 2>3 | 3>3 | 4>3 | 5>3 | 6>3 |
| 4 | 0>4 | 1>4 | 2>4 | 3>4 | 4>4 | 5>4 | 6>4 |
| 5 | 0>5 | 1>5 | 2>5 | 3>5 | 4>5 | 5>5 | 6>5 |
| 6 | 0>6 | 1>6 | 2>6 | 3>6 | 4>6 | 5>6 | 6>6 |

FIG. 52

| Tuple Count | First | | | | | | |
|---|---|---|---|---|---|---|---|
| Last | 0 | 1 | 2 | 3 | 4 | 5 | 6 |
| 0 | 0 | 0 | 0 | 0 | 0 | 4 | 35 |
| 1 | 0 | 0 | 0 | 0 | 0 | 0 | 0 |
| 2 | 0 | 0 | 0 | 0 | 0 | 1 | 0 |
| 3 | 0 | 0 | 0 | 0 | 0 | 4 | 4 |
| 4 | 0 | 0 | 0 | 0 | 0 | 0 | 0 |
| 5 | 1 | 0 | 0 | 8 | 0 | 0 | 0 |
| 6 | (39) | 0 | 0 | 0 | 0 | 0 | 0 |

| Alphabet | Definition | |
|---|---|---|
| | First | Last |
| 0 | 0 | - |
| 1 | 1 | - |
| 2 | 1 | 0 |
| 3 | 2 | 0 |
| 4 | 1 | 3 |
| 5 | 4 | 0 |
| 6 | 2 | 5 |
| 7 | 0 | 6 |

| Symbol | Symbol Count | Huffman Code |
|---|---|---|
| 0 | 1 | 0100 |
| 1 | 0 | - |
| 2 | 1 | 01011 |
| 3 | 8 | 011 |
| 4 | 0 | - |
| 5 | 9 | 00 |
| 6 | 0 | - |
| 7 | 39 | 1 |
| EOF | 1 | 01010 |

| Symbol | Huffman Code | Bit Length | Symbol Count | Total Bits |
|---|---|---|---|---|
| 0 | 0100 | 4 | 1 | 4 |
| 2 | 01011 | 5 | 1 | 5 |
| 3 | 011 | 3 | 8 | 24 |
| 5 | 00 | 2 | 9 | 18 |
| 7 | 1 | 1 | 39 | 39 |
| EOF | 01010 | 5 | 1 | 5 |
| | | | Total Bits for Data | 95 |

| Compression Overhead | Current |
|---|---|
| File Information | 8 |
| Dictionary Length | 28 |
| Tree Length | 35 |
| Total Overhead | 71 |

| Symbol | Occurrences | Huffman Code | Original Bits | Total Original Bits Represented | % of File Represented |
|---|---|---|---|---|---|
| 7 | 39 | 1 | 01011000 | 312 | 81.2 |
| 5 | 9 | 00 | 11000 | 45 | 11.7 |
| 3 | 8 | 011 | 100 | 24 | 6.2 |
| 2 | 1 | 01011 | 10 | 2 | 0.5 |
| 0 | 1 | 0100 | 0 | 1 | 0.3 |
| EOF | 1 | 01010 | N/A | N/A | N/A |

| Binary Powers | Decimal Value | Binary Value | Number of Bits |
|---|---|---|---|
| 2^0 | 1 | 1 | 1 |
| 2^1 | 2 | 10 | 2 |
| 2^2 | 4 | 100 | 3 |
| 2^3 | 8 | 1000 | 4 |
| 2^4 | 16 | 10000 | 5 |

```
                                                    30-7
                                                   ↙
0 5 7 7 7 7 7 7 7 7 7 7 7 7 7 7 7 7 7 7 7 7 7 7 7 3 5 7
7 7 3 5 7 7 7 7 7 7 7 3 5 7 3 5 3 5 3 5 3 5 3 5 2 EOF
```

FIG. 66

| Symbol | Huffman Code |
|---|---|
| 0 | 0100 |
| 2 | 01011 |
| 3 | 011 |
| 5 | 00 |
| 7 | 1 |
| EOF | 01010 |

| Symbol | Bits per Symbol |
|---|---|
| 2 | 1 |
| 3 | 2 |
| 4 | 2 |
| 5 | 3 |
| 6 | 3 |
| 7 | 3 |

FIG. 72

| Symbol | Tuple | |
|---|---|---|
| | First | Last |
| 0 | atomic | atomic |
| 1 | atomic | atomic |
| 2 | 1 | 0 |
| 3 | 2 | 0 |
| 4 | 1 | 3 |
| 5 | 4 | 0 |
| 6 | 2 | 5 |
| 7 | 0 | 6 |

FIG. 73

| Encoded Data | Symbol and Original Bits Represented |
|---|---|
| 0100 | Symbol 0 = 0 |
| 00 | Symbol 5 = 11000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 011 | Symbol 3 = 100 |
| 00 | Symbol 5 = 11000 |
| 1 | Symbol 7 = 01011000 |
| 1 | Symbol 7 = 01011000 |
| 1 | Symbol 7 = 01011000 |
| 011 | Symbol 3 = 100 |
| 00 | Symbol 5 = 11000 |

FIG. 82a

| Encoded Data | Symbol and Original Bits Represented |
|---|---|
| 1 | Symbol 7 = 01011000 |
| 1 | Symbol 7 = 01011000 |
| 1 | Symbol 7 = 01011000 |
| 011 | Symbol 3 = 100 |
| 00 | Symbol 5 = 11000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 1 | Symbol 7 = 01011000 |
| 011 | Symbol 3 = 100 |
| 00 | Symbol 5 = 11000 |
| 1 | Symbol 7 = 01011000 |
| 011 | Symbol 3 = 100 |
| 00 | Symbol 5 = 11000 |
| 011 | Symbol 3 = 100 |
| 00 | Symbol 5 = 11000 |
| 011 | Symbol 3 = 100 |
| 00 | Symbol 5 = 11000 |
| 011 | Symbol 3 = 100 |
| 00 | Symbol 5 = 11000 |
| 011 | Symbol 3 = 100 |
| 00 | Symbol 5 = 11000 |
| 01011 | Symbol 2 = 10 |
| 01010 | EOF=done |

| Symbol | Tuple First | Last |
|---|---|---|
| 0 | atomic | atomic |
| 1 | atomic | atomic |
| 2 | 1 | 0 |
| 3 | 2 | 0 |
| 4 | 1 | 3 |
| 5 | 4 | 0 |
| 6 | 5 | 3 |
| 7 | 5 | 0 |
| 8 | 7 | 2 |

| Symbol | Count |
|--------|-------|
| 0 | 1 |
| 1 | 0 |
| 2 | 1 |
| 3 | 0 |
| 4 | 0 |
| 5 | 1 |
| 6 | 14 |
| 7 | 0 |
| 8 | 14 |
| EOF | 1 |

| Symbol | Symbol Count | Huffman Code |
|---|---|---|
| 0 | 1 | 1001 |
| 1 | 0 | – |
| 2 | 1 | 1010 |
| 3 | 0 | – |
| 4 | 0 | – |
| 5 | 1 | 1011 |
| 6 | 14 | 11 |
| 7 | 0 | – |
| 8 | 14 | 0 |
| EOF | 1 | 1000 |

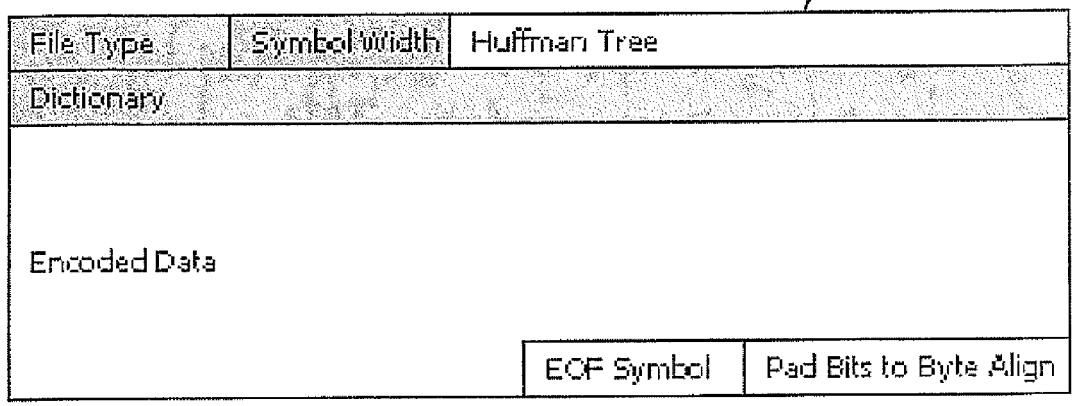
 Re-Used Key Information
 New Key Information and Encoded Data
Fig. 93

US 9,390,098 B2

FAST APPROXIMATION TO OPTIMAL COMPRESSION OF DIGITAL DATA

This utility application claims priority to U.S. Provisional Application Ser. Nos. 61/236,571 and 61/271,079, filed Aug. 25, 2009, and Jul. 16, 2009, respectively. Their contents are expressly incorporated herein as if set forth herein.

FIELD OF THE INVENTION

The present invention relates generally to compression/decompression of data. More particularly, it relates to a fast approximation of compression of current data by using information obtained from an earlier compression of similar data. Techniques and algorithms are also involved, to name a few.

BACKGROUND OF THE INVENTION

Recent data suggests that nearly eighty-five percent of all data is found in computing files and growing annually at around sixty percent. One reason for the growth is that regulatory compliance acts, statutes, etc., (e.g., Sarbanes-Oxley, HIPAA, PCI) force companies to keep file data in an accessible state for extended periods of time. However, block level operations in computers are too lowly to apply any meaningful interpretation of this stored data beyond taking snapshots and block de-duplication. While other business intelligence products have been introduced to provide capabilities greater than block-level operations, they have been generally limited to structured database analysis. They are much less meaningful when acting upon data stored in unstructured environments.

Unfortunately, entities the world over have paid enormous sums of money to create and store their data, but cannot find much of it later in instances where it is haphazardly arranged or arranged less than intuitively. Not only would locating this information bring back value, but being able to observe patterns in it might also prove valuable despite its usefulness being presently unknown. However, entities cannot expend so much time and effort in finding this data that it outweighs its usefulness. Notwithstanding this, there are still other scenarios, such as government compliance, litigation, audits, etc., that dictate certain data/information be found and produced, regardless of its cost in time, money and effort. Thus, a clear need is identified in the art to better find, organize and identify digital data, especially data left in unstructured states.

In search engine technology, large amounts of unrelated and unstructured digital data can be quickly gathered. However, most engines do little to organize the data other than give a hierarchical presentation. Also, when the engine finds duplicate versions of data, it offers few to no options on eliminating the replication or migrating/relocating redundancies. Thus, a further need in the art exists to overcome the drawbacks of search engines.

When it comes to large amounts of data, whether structured or not, compression techniques have been devised to preserve storage capacity, reduce bandwidth during transmission, etc. With modern compression algorithms, however, they simply exist to scrunch large blocks of data into smaller blocks according to their advertised compression ratios. As is known, some do it without data loss (lossless) while others do it "lossy." None do it, unfortunately, with a view toward recognizing similarities in the data itself.

From biology, it is known that highly similar species have highly similar DNA strings. In the computing context, consider two word processing files relating to stored baseball statistics. In a first file, words might appear for a baseball batter, such as "batting average," "on base percentage," and "slugging percentage," while a second file might have words for a baseball pitcher, such as "strikeouts," "walks," and "earned runs." Conversely, a third file wholly unrelated to baseball, statistics or sports, may have words such as "environmental protection," "furniture," or whatever comes to mind. It would be exceptionally useful if, during times of compression, or upon later manipulation by an algorithm if "mapping" could recognize the similarity in subject matter in the first two files, although not exact to one another, and provide options to a user. Appreciating that the "words" in the example files are represented in the computing context as binary bits (1's or 0's), which occurs by converting the English alphabet into a series of 1's and 0's through application of ASCII encoding techniques, it would be further useful if the compression algorithm could first recognize the similarity in subject matter of the first two files at the level of raw bit data. The reason for this is that not all files have words and instead might represent pictures (e.g., .jpeg) or spread sheets of numbers.

Appreciating that certain products already exist in the above-identified market space, clarity on the need in the art is as follows. One, present day "keyword matching" is limited to select set of words that have been pulled from a document into an index for matching to the same exact words elsewhere. Two, "Grep" is a modern day technique that searches one or more input files for lines containing an identical match to a specified pattern. Three, "Beyond Compare," and similar algorithms, are line-by-line comparisons of multiple documents that highlight differences between them. Four, block level data de-duplication has no application in compliance contexts, data relocation, or business intelligence.

The need in the art, on the other hand, needs to serve advanced notions of identifying new business intelligence, conducting operations on completely unstructured or haphazard data, and organizing it, providing new useful options to users, providing new user views, providing new encryption products, and identifying highly similar data, to name a few. As a byproduct, solving this need will create new opportunities in minimizing transmission bandwidth and storage capacity, among other things. Naturally, any improvements along such lines should contemplate good engineering practices, such as stability, ease of implementation, unobtrusiveness, etc.

SUMMARY OF THE INVENTION

The foregoing and other problems become solved by applying the principles and teachings associated with a fast approximation to optimal compression of digital data. Broadly, methods and apparatus involve compression of current data by using information obtained from an earlier compression of similar data. It overcomes the iterative process of discovering a unique set of optimal symbols for the current data.

In a representative embodiment, a dictionary of symbols corresponding to original data from an earlier compressed file is extracted. Original bits are then obtained from the symbols. Sequences of the original bits are identified in the current data of the current file under consideration. A new bit stream for the current file is created from the original bits and according to the symbols they represent. Every occurrence of the symbols is counted in the new bit stream and a path-weighted Huffman tree is created from the counted occurrences. A coding from the Huffman tree ensues, along with an end-of-file marker. The latter is stored in a new compression file, including the dictionary earlier extracted from the earlier compressed file. The file type and symbol width of the earlier compressed file may also be reused in the new compression file.

Executable instructions loaded on one or more computing devices for undertaking the foregoing are also contemplated as are computer program products available as a download or on a computer readable medium. The computer program products are also available for installation on a network appliance or an individual computing device.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1 is a table in accordance with the present invention showing terminology;

FIG. 4 is a table in accordance with the present invention showing the Count from FIG. 3 in array form;

FIG. 6 is a table in accordance with the present invention showing a representative resolution of a tie in the counts of three highest occurring tuples using Pythagorean's Theorem;

FIG. 7 is a table in accordance with the present invention showing an alternative resolution of a tie in the counts of highest occurring tuples;

FIGS. 8-60 are iterative data streams and tables in accordance with the present invention depicting dictionaries, arrays, tuple counts, encoding, and the like illustrative of multiple passes through the compression algorithm;

FIG. 62 is a table in accordance with the present invention showing compression statistics;

FIGS. 63-69 are diagrams and tables in accordance with the present invention relating to storage of a compressed file;

FIGS. 70-82*b* are data streams, tree diagrams and tables in accordance with the present invention relating to decompression of a compressed file;

FIGS. 84-93 are diagrams in accordance with a "fast approximation" embodiment of the invention that utilizes key information of an earlier compressed file for a file under present consideration having patterns substantially similar to the earlier compressed file.

DETAILED DESCRIPTION OF THE ILLUSTRATED EMBODIMENTS

Figure 2:
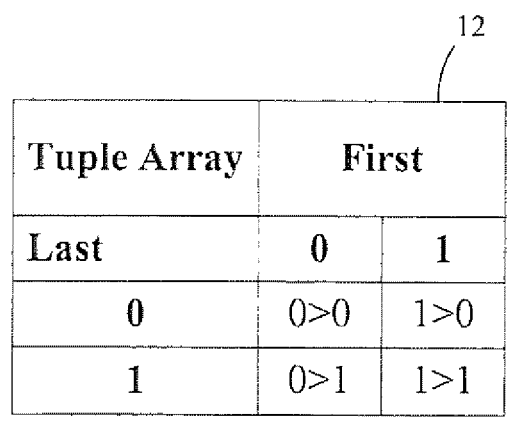
FIG. 2 a table in accordance with the present invention showing a tuple array and tuple nomenclature.

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for optimizing data compression of digital data.

In a representative embodiment, compression occurs by finding highly occurring patterns in data streams, and replacing them with newly defined symbols that require less space to store than the original patterns. The goal is to eliminate as much redundancy from the digital data as possible. The end result has been shown by the inventor to achieve greater compression ratios on certain tested files than algorithms heretofore known.

In information theory, it is well understood that collections of data contain significant amounts of redundant information. Some redundancies are easily recognized, while others are difficult to observe. A familiar example of redundancy in the English language is the ordered pair of letters QU. When Q appears in written text, the reader anticipates and expects the letter U to follow, such as in the words queen, quick, acquit, and square. The letter U is mostly redundant information when it follows Q. Replacing a recurring pattern of adjacent characters with a single symbol can reduce the amount of space that it takes to store that information. For example, the ordered pair of letters QU can be replaced with a single memorable symbol when the text is stored. For this example, the small Greek letter alpha ($\alpha$) is selected as the symbol, but any could be chosen that does not otherwise appear in the text under consideration. The resultant compressed text is one letter shorter for each occurrence of QU that is replaced with the single symbol (a), e.g., "$\alpha$een," "$\alpha$ick." "ac$\alpha$it," and "s$\alpha$are." Such is also stored with a definition of the symbol alpha ($\alpha$) in order to enable the original data to be restored. Later, the compressed text can be expanded by replacing the symbol with the original letters QU. There is no information loss. Also, this process can be repeated many times over to achieve further compression.

DEFINITIONS

With reference to FIG. 1, a table 10 is used to define terminology used in the below compression method and procedure.

Discussion

Redundancy is the superfluous repetition of information. As demonstrated in the QU example above, adjacent characters in written text often form expected patterns that are easily detected. In contrast, digital data is stored as a series of bits where each bit can have only one of two values: off (represented as a zero (0)) and on (represented as a one (1)). Redundancies in digital data, such as long sequences of zeros or ones, are easily seen with the human eye. However, patterns are not obvious in highly complex digital data. The invention's methods and procedures identify these redundancies in stored information so that even highly complex data can be compressed. In turn, the techniques can be used to reduce, optimize, or eliminate redundancy by substituting the redundant information with symbols that take less space to store than the original information. When it is used to eliminate redundancy, the method might originally return compressed data that is larger than the original. This can occur because information about the symbols and how the symbols are encoded for storage must also be stored so that the data can be decompressed later. For example, compression of the word "queen" above resulted in the compressed word "αeen." But a dictionary having the relationship QU=α also needed to be stored with the word "αeen," which makes a "first pass" through the compression technique increase in size, not decrease. Eventually, however, further "passes" will stop increasing and decrease so rapidly, despite the presence of an ever-growing dictionary size, that compression ratios will be shown to greatly advance the state of the art. By automating the techniques with computer processors and computing software, compression will also occur exceptionally rapidly. In addition, the techniques herein will be shown to losslessly compress the data.

The Compression Procedure

The following compression method iteratively substitutes symbols for highly occurring tuples in a data stream. An example of this process is provided later in the document.

Prerequisites

The compression procedure will be performed on digital data. Each stored bit has a value of binary 0 or binary 1. This series of bits is referred to as the original digital data.

Preparing the Data

The original digital data is examined at the bit level. The series of bits is conceptually converted to a stream of characters, referred to as the data stream that represents the original data. The symbols 0 and 1 are used to represent the respective raw bit values in the new data stream. These symbols are considered to be atomic because all subsequently defined symbols represent tuples that are based on 0 and 1.

A dictionary is used to document the alphabet of symbols that are used in the data stream. Initially, the alphabet consists solely of the symbols 0 and 1.

Compressing the Data Stream

The following tasks are performed iteratively on the data stream:

Identifying all possible tuples that can occur for the set of characters that are in the current data stream.

Determining which of the possible tuples occurs most frequently in the current data stream. In the case of a tie, use the most complex tuple. (Complexity is discussed below.)

Creating a new symbol for the most highly occurring tuple, and add it to the dictionary.

Replacing all occurrences of the most highly occurring tuple with the new symbol.

Encoding the symbols in the data stream by using an encoding scheme, such as a path-weighted Huffman coding scheme.

Calculating the compressed file size.

Determining whether the compression goal has been achieved.

Repeating for as long as necessary to achieve optimal compression. That is, if a stream of data were compressed so completely that it was represented by a single bit, it and its complementary dictionary would be larger than the original representation of the stream of data absent the compression. (For example, in the QU example above, if "α" represented the entire word "queen," the word "queen" could be reduced to one symbol, e.g., "α." However, this one symbol and its dictionary (reciting "queen=α" is larger than the original content "queen.") Thus, optimal compression herein recognizes a point of marginal return whereby the dictionary grows too large relative to the amount of compression being achieved by the technique.

Each of these steps is described in more detail below.

Identifying all Possible Tuples

From FIG. 1, a "tuple" is an ordered pair of adjoining characters in a data stream. To identify all possible tuples in a given data stream, the characters in the current alphabet are systematically combined to form ordered pairs of symbols. The left symbol in the pair is referred to as the "first" character, while the right symbol is referred to as the "last" character. In a larger context, the tuples represent the "patterns" examined in a data stream that will yield further advantage in the art.

In the following example and with any data stream of digital data that can be compressed according to the techniques herein, two symbols (0 and 1) occur in the alphabet and are possibly the only symbols in the entire data stream. By examining them as "tuples," the combination of the 0 and 1 as ordered pairs of adjoining characters reveals only four possible outcomes, i.e., a tuple represented by "00," a tuple represented by "01," a tuple represented by "10," and a tuple represented by "11."

With reference to FIG. 2, these four possibilities are seen in table 12. In detail, the table shows the tuple array for characters 0 and 1. In the cell for column 0 and row 0, the tuple is the ordered pair of 0 followed by 0. The shorthand notation of the tuple in the first cell is "0>0". In the cell for column 0 and row 1, the tuple is 0 followed by 1, or "0>1". In the cell for column 1 and row 0, the tuple is "1>0". In the cell for column 1 and row 1, the tuple is "1>1".

Determining the Most Highly Occurring Tuple

With FIG. 2 in mind, it is determined which tuple in a bit stream is the most highly occurring. To do this, simple counting occurs. It reveals how many times each of the possible tuples actually occurs. Each pair of adjoining characters is compared to the possible tuples and the count is recorded for the matched tuple.

The process begins by examining the adjacent characters in position one and two of the data stream. Together, the pair of characters forms a tuple. Advance by one character in the stream and examine the characters in positions two and three. By incrementing through the data stream one character at a time, every combination of two adjacent characters in the data stream is examined and tallied against one of the tuples.

Sequences of repeated symbols create a special case that must be considered when tallying tuples. That is, when a symbol is repeated three or more times, skilled artisans might identify instances of a tuple that cannot exist because the symbols in the tuple belong to other instances of the same tuple. The number of actual tuples in this case is the number of times the symbol repeats divided by two.

Figure 3:
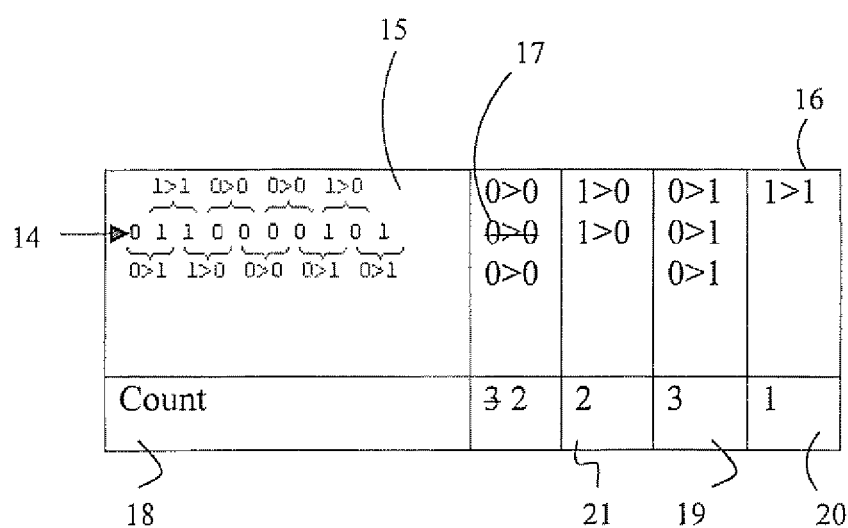
FIG. 3 is a table in accordance with the present invention showing the counting of tuples in a data stream.

For example, consider the data stream 14 in table 16 (FIG. 3) having 10 characters shown as "0110000101." Upon examining the first two characters 01, a tuple is recognized in the form 0 followed by 1 (0>1). Then, increment forward one character and consider the second and third characters 11, which forms the tuple of 1 followed by 1 (1>1). As progression occurs through the data stream, 9 possible tuple combinations are found: 0>1, 1>1, 1>0, 0>0, 0>0, 0>0, 0>1, 1>0, and 0>1 (element 15, FIG. 3). In the sequence of four sequential zeros (at the fourth through seventh character positions in the data stream "011<u>0000</u>101"), three instances of a 0 followed by a 0 (or 0>0) are identified as possible tuples. It is observed that the second instance of the 0>0 tuple (element 17, FIG. 3) cannot be formed because the symbols are used in the 0>0 tuple before and after it, by prescribed rule. Thus, there are only two possible instances in the COUNT 18, FIG. 3, of the 0>0 tuple, not 3. In turn, the most highly occurring tuple counted in this data stream is 0>1, which occurs 3 times (element 19, FIG. 3). Similarly, tuple 1>1 occurs once (element 20, FIG. 3), while tuple 1>0 occurs twice (element 21, FIG. 3).

Figure 4:
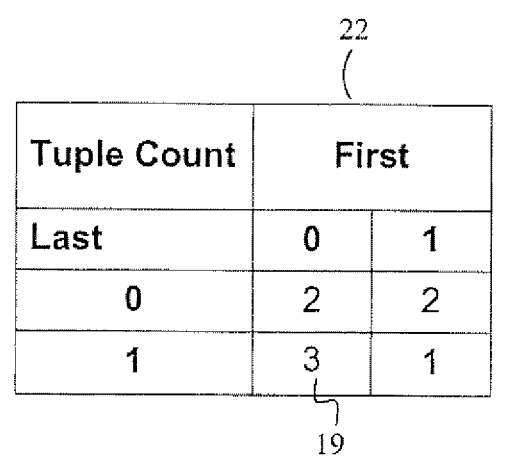

After the entire data stream has been examined, the final counts for each tuple are compared to determine which tuple occurs most frequently. In tabular form, the 0 followed by a 1 (tuple 0>1) occurs the most and is referenced at element 19 in table 22, FIG. 4.

In the situation of a tie between two or more tuples, skilled artisans must choose between one of the tuples. For this, experimentation has revealed that choosing the tuple that contains the most complex characters usually results in the most efficient compression. If all tuples are equally complex, skilled artisans can choose any one of the tied tuples and define it as the most highly occurring.

Figure 5:
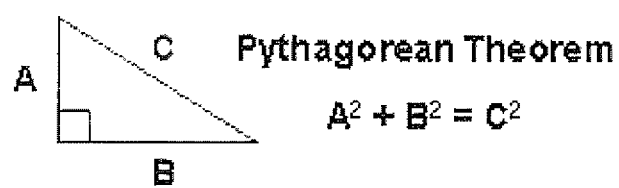
FIG. 5 is Pythagorean's Theorem for use in resolving ties in the counts of highest occurring tuples.

The complexity of a tuple is determined by imagining that the symbols form the sides of a right triangle, and the complexity is a measure of the length of the hypotenuse of that triangle. Of course, the hypotenuse is related to the sum of the squares of the sides, as defined by the Pythagorean Theorem, FIG. 5.

The tuple with the longest hypotenuse is considered the most complex tuple, and is the winner in the situation of a tie between the highest numbers of occurring tuples. The reason for this is that less-complex tuples in the situation of a tie are most likely to be resolved in subsequent passes in the decreasing order of their hypotenuse length. Should a tie in hypotenuse length occur, or a tie in complexity, evidence appears to suggest it does not make a difference which tuple is chosen as the most highly occurring.

For example, suppose that tuples 3>7, 4>4 and 1>5 each occur 356 times when counted (in a same pass). To determine the complexity of each tuple, use the tuple symbols as the two sides of a right triangle and calculate the hypotenuse, FIG. 6. In the instance of 3>7, the side of the hypotenuse is the square root of (three squared (9) plus seven squared (49)), or the square root of 58, or 7.6. In the instance of 4>4, the side of the hypotenuse is the square root of (four squared (16) plus four squared (16), of the square root of 32, or 5.7. Similar, 1>5 calculates as a hypotenuse of 5.1 as seen in table 23 in the Figure. Since the tuple with the largest hypotenuse is the most complex, 3>7's hypotenuse of 7.6 is considered more complex than either of the tuples 4>4 or 1>5.

Skilled artisans can also use the tuple array to visualize the hypotenuse by drawing lines in the columns and rows from the array origin to the tuple entry in the array, as shown in table 24 in FIG. 7. As seen, the longest hypotenuse is labeled 25, so the 3>7 tuple wins the tie, and is designated as the most highly occurring tuple. Hereafter, a new symbol is created to replace the highest occurring tuple (whether occurring the most outright by count or by tie resolution), as seen below. However, based on the complexity rule, it is highly likely that the next passes will replace tuple 4>4 and then tuple 1>5.

Creating a Symbol for the Most Highly Occurring Tuple

As before, a symbol stands for the two adjacent characters that form the tuple and skilled artisans select any new symbol they want provided it is not possibly found in the data stream elsewhere. Also, since the symbol and its definition are added to the alphabet, e.g., if "α=QU," a dictionary grows by one new symbol in each pass through the data, as will be seen. A good example of a new symbol for use in the invention is a numerical character, sequentially selected, because numbers provide an unlimited source of unique symbols. In addition, reaching an optimized compression goal might take thousands (or even tens of thousands) of passes through the data stream and redundant symbols must be avoided relative to previous passes and future passes.

Replacing the Tuple with the New Symbol

Upon examining the data stream to find all occurrences of the highest occurring tuple, skilled artisans simply substitute the newly defined or newly created symbol for each occurrence of that tuple. Intuitively, substituting a single symbol for two characters compresses the data stream by one character for each occurrence of the tuple that is replaced.

Encoding the Alphabet

To accomplish this, counting occurs for how many times that each of the symbols in the current alphabet occurs in the data stream. They then use the symbol count to apply an encoding scheme, such as a path-weighted Huffman coding scheme, to the alphabet. Huffman trees should be within the purview of the artisan's skill set.

The encoding assigns bits to each symbol in the current alphabet that actually appears in the data stream. That is, symbols with a count of zero occurrences are not encoded in the tree. Also, symbols might go "extinct" in the data stream as they are entirely consumed by yet more complex symbols, as will be seen. As a result, the Huffman code tree is rebuilt every time a new symbol is added to the dictionary. This means that the Huffman code for a given symbol can change with every pass. The encoded length of the data stream usually decreases with each pass.

Calculating the Compressed File Size

The compressed file size is the total amount of space that it takes to store the Huffman-encoded data stream plus the information about the compression, such as information about the file, the dictionary, and the Huffman encoding tree. The compression information must be saved along with other information so that the encoded data can be decompressed later.

To accomplish this, artisans count the number of times that each symbol appears in the data stream. They also count the number of bits in the symbol's Huffman code to find its bit length. They then multiply the bit length by the symbol count to calculate the total bits needed to store all occurrences of the symbol. This is then repeated for each symbol. Thereafter, the total hit counts for all symbols are added to determine how many bits are needed to store only the compressed data. To determine the compressed file size, add the total bit count for the data to the number of bits required for the related compression information (the dictionary and the symbol-encoding information).

Determining Whether the Compression Goal has been Achieved

Substituting a tuple with a single symbol reduces the total number of characters in a data stream by one for each instance of a tuple that is replaced by a symbol. That is, for each instance, two existing characters are replaced with one new character. In a given pass, each instance of the tuple is replaced by a new symbol. There are three observed results:

The length of the data stream (as measured by how many characters make up the text) decreases by half the number of tuples replaced.

The number of symbols in the alphabet increases by one.

The number of nodes in the Huffman tree increases by two.

By repeating the compression procedure a sufficient number of times, any series of characters can eventually be reduced to a single character. That "super-symbol" character conveys the entire meaning of the original text. However, the information about the symbols and encoding that is used to reach that final symbol is needed to restore the original data later. As the number of total characters in the text decreases with each repetition of the procedure, the number of symbols increases by one. With each new symbol, the size of the dictionary and the size of the Huffman tree increase, while the size of the data decreases relative to the number of instances of the tuple it replaces. It is possible that the information about the symbol takes more space to store than the original data it replaces. In order for the compressed file size to become smaller than the original data stream size, the text size must decrease faster than the size increases for the dictionary and the Huffman encoding information.

The question at hand is then, what is the optimal number of substitutions (new symbols) to make, and how should those substitutions be determined?

For each pass through the data stream, the encoded length of the text decreases, while the size of the dictionary and the Huffman tree increases. It has been observed that the compressed file size will reach a minimal value, and then increase. The increase occurs at some point because so few tuple replacements are done that the decrease in text size no longer outweighs the increase in size of the dictionary and Huffman tree.

The size of the compressed file does not decrease smoothly or steadily downward. As the compression process proceeds, the size might plateau or temporarily increase. In order to determine the true (global) minimum, it is necessary to continue some number of iterations past the each new (local) minimum point. This true minimal value represents the optimal compression for the data stream using this method.

Through experimentation, three conditions have been found that can be used to decide when to terminate the compression procedure: asymptotic reduction, observed low, and single character. Each method is described below. Other terminating conditions might be determined through further experimentation.

Asymptotic Reduction

An asymptotic reduction is a concession to processing efficiency, rather than a completion of the procedure. When compressing larger files (100 kilobytes (KB) or greater), after several thousand passes, each additional pass produces only a very small additional compression. The compressed size is still trending downward, but at such a slow rate that additional compute time is not warranted.

Based on experimental results, the process is terminated if at least 1000 passes have been done, and less than 1% of additional data stream compression has occurred in the last 1000 passes. The previously noted minimum is therefore used as the optimum compressed file.

Observed Low

A reasonable number of passes have been performed on the data and in the last reasonable number of passes a new minimum encoded file size has not been detected. It appears that further passes only result in a larger encoded file size.

Based on experimental results, the process is terminated if at least 1000 passes have been done, and in the last 10% of the passes, a new low has not been established. The previously noted minimum is then used as the optimum compressed file.

Single Character

The data stream has been reduced to exactly one character. This case occurs if the file is made up of data that can easily reduce to a single symbol, such a file filled with a repeating pattern. In cases like this, compression methods other than this one might result in smaller compressed file sizes.

How the Procedure Optimizes Compression

The representative embodiment of the invention uses Huffman trees to encode the data stream that has been progressively shortened by tuple replacement, and balanced against the growth of the resultant Huffman tree and dictionary representation.

The average length of a Huffman encoded symbol depends upon two factors:

How many symbols must be represented in the Huffman tree

The distribution of the frequency of symbol use

The average encoded symbol length grows in a somewhat stepwise fashion as more symbols are added to the dictionary. Because the Huffman tree is a binary tree, increases naturally occur as the number of symbols passes each level of the power of 2 (2, 4, 8, 16, 32, 64, etc.). At these points, the average number of bits needed to represent any given symbol normally increases by 1 bit, even though the number of characters that need to be encoded decreases. Subsequent compression passes usually overcome this temporary jump in encoded data stream length.

The second factor that affects the efficiency of Huffman coding is the distribution of the frequency of symbol use. If one symbol is used significantly more than any other, it can be assigned a shorter encoding representation, which results in a shorter encoded length overall, and results in maximum compression. The more frequently a symbol occurs, the shorter the encoded stream that replaces it. The less frequently a symbol occurs, the longer the encoded stream that replaces it.

If all symbols occur at approximately equal frequencies, the number of symbols has the greater effect than does the size of the encoded data stream. Supporting evidence is that maximum compression occurs when minimum redundancy occurs, that is, when the data appears random. This state of randomness occurs when every symbol occurs at the same frequency as any other symbol, and there is no discernable ordering to the symbols.

The method and procedure described in this document attempt to create a state of randomness in the data stream. By replacing highly occurring tuples with new symbols, eventually the frequency of all symbols present in the data stream becomes roughly equal. Similarly, the frequency of all tuples is also approximately equal. These two criteria (equal occurrence of every symbol and equal occurrence of ordered symbol groupings) is the definition of random data. Random data means no redundancy. No redundancy means maximum compression.

This method and procedure derives optimal compression from a combination of the two factors. It reduces the number of characters in the data stream by creating new symbols to replace highly occurring tuples. The frequency distribution of symbol occurrence in the data stream tends to equalize as oft occurring symbols are eliminated during tuple replacement. This has the effect of flattening the Huffman tree, minimizing average path lengths, and therefore, minimizing encoded data stream length. The number of newly created symbols is held to a minimum by measuring the increase in dictionary size against the decrease in encoded data stream size.

Example of Compression

To demonstrate the compression procedure, a small data file contains the following simple ASCII characters:

aaaaaaaaaaaaaaaaaaaaaaaaaaabaaabaaaaaaaababbbbbb

Each character is stored as a sequence of eight bits that correlates to the ASCII code assigned to the character. The bit values for each character are:

a=01100001
b=01100010

The digital data that represents the file is the original data that we use for our compression procedure. Later, we want to decompress the compressed file to get back to the original data without data loss.

Preparing the Data Stream

The digital data that represents the file is a series of bits, where each bit has a value of 0 or 1. We want to abstract the view of the bits by conceptually replacing them with symbols to form a sequential stream of characters, referred to as a data stream.

Figure 8:
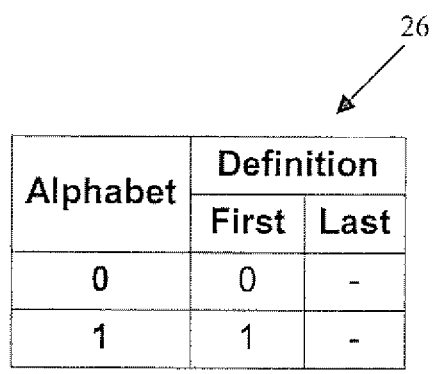
FIG. 8 is an initial dictionary in accordance with the present invention for the data stream of FIG. 9.

For our sample digital data, we create two new symbols called 0 and 1 to represent the raw bit values of 0 and 1, respectively. These two symbols form our initial alphabet, so we place them in the dictionary 26, FIG. 8.

Figure 9:
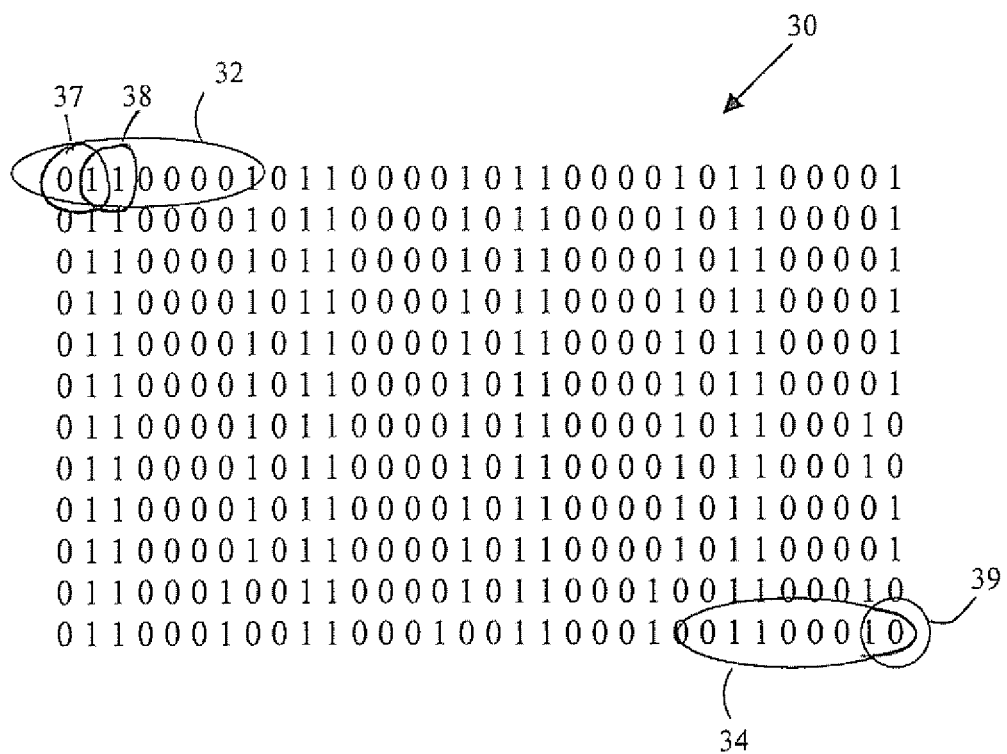

The data stream 30 in FIG. 9 represents the original series of bits in the stored file, the first eight bits 32 are "01100001" and correspond to the first letter "a" in the data file. Similarly, the very last eight bits 34 are "01100010" and correspond to the final letter "b" in the data file, and each of the 1's and 0's come from the ASCII code above.

Also, the characters in data stream 30 are separated with a space for user readability, but the space is not considered, just the characters. The space would not occur in computer memory either.

Compressing the Data Stream

The data stream 30 of FIG. 9 is now ready for compression. The procedure will be repeated until the compression goal is achieved. For this example, the compression goal is to minimize the amount of space that it takes to store the digital data.

Initial Pass

For the initial pass, the original data stream and alphabet that were created in "Preparing the Data Stream" are obtained.

Identifying all Possible Tuples

Figure 10:
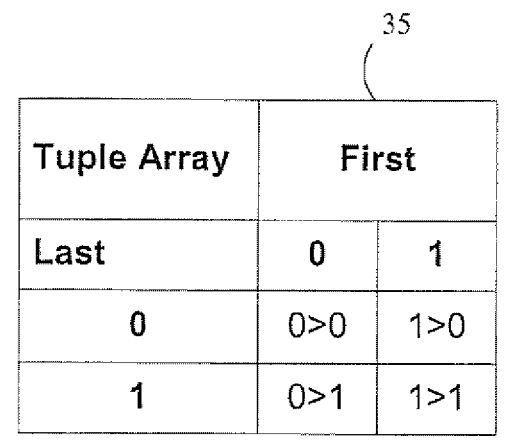

An easy way to identify all possible combinations of the characters in our current alphabet (at this time having 0 and 1) is to create a tuple array (table 35, FIG. 10). Those symbols are placed or fitted as a column and row, and the cells are filled in with the tuple that combines those symbols. The columns and rows are constructed alphabetically from left to right and top to bottom, respectively, according to the order that the symbols appear in our dictionary. For this demonstration, we will consider the symbol in a column to be the first character in the tuple, and the symbol in a row to be the last character in the tuple. To simplify the presentation of tuples in each cell, we will use the earlier-described notation of "first>last" to indicate the order of appearance in the pair of characters, and to make it easier to visually distinguish the symbols in the pair. The tuples shown in each cell now represent the patterns we want to look for in the data stream.

For example, the table 35 shows the tuple array for characters 0 and 1. In the cell for column 0 and row 0, the tuple is the ordered pair of 0 followed by 0. The shorthand notation of the tuple in the first cell is "0>0". In the cell for column 0 and row 1, the tuple is 0 followed by 1, or "0>1". In the cell for column 1 and row 0, the tuple is "1>0". In the cell for column 1 and row 1, the tuple is "1>1". (As skilled artisans will appreciate, most initial dictionaries and original tuple arrays will be identical to these. The reason is that computing data streams will all begin with a stream of 1's and 0's having two symbols only.)

Determining the Highly Occurring Tuple

After completion of the tuple array, we are ready to look for the tuples in the data stream 30, FIG. 9. We start at the beginning of the data stream with the first two characters "01" labeled element 37. We compare this pair of characters to our known tuples, keeping in mind that order matters. We match the pair to a tuple, and add one count for that instance. We move forward by one character, and look at the pair of characters 38 in positions two and three in the data stream, or "11." We compare and match this pair to one of the tuples, and add one count for that instance. We continue tallying occurrences of the tuples in this manner until we reach the end of the data stream. In this instance, the final tuple is "10" labeled 39. By incrementing through the data stream one character at a time, we have considered every combination of two adjacent characters in the data stream, and tallied each instance against one of the tuples. We also consider the rule for sequences of repeated symbols, described above, to determine the actual number of instances for the tuple that is defined by pairs of that symbol.

Figure 11:
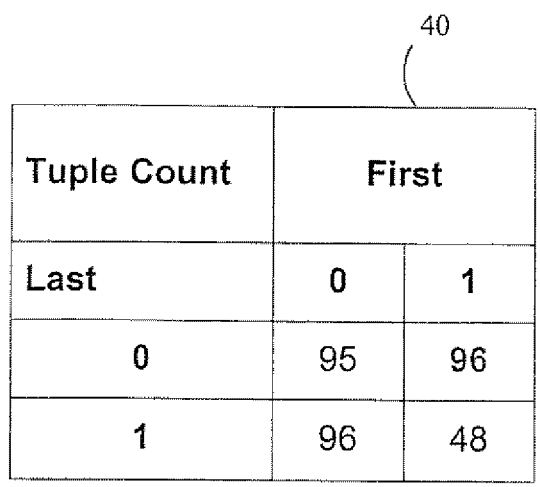

For example, the first two characters in our sample data stream are 0 followed by 1. This matches the tuple 0>1, so we count that as one instance of the tuple. We step forward one character. The characters in positions two and three are 1 followed by 1, which matches the tuple 1>1. We count it as one instance of the 1>1 tuple. We consider the sequences of three or more zeros in the data stream (e.g., 01100001 . . . ) to determine the actual number of tuples for the 0>0 tuple. We repeat this process to the end of the data set with the count results in table 40, FIG. 11.

Now that we have gathered statistics for how many times each tuple appears in the data stream 30, we compare the total counts for each tuple to determine which pattern is the most highly occurring. The tuple that occurs most frequently is a tie between a 1 followed by 0 (1>0), which occurs 96 times, and a 0 followed by 1 (0>1), which also occurs 96 times. As discussed above, skilled artisans then choose the most complex tuple and do so according to Pythagorean's Theorem. The sum of the squares for each tuple is the same, which is 1 (1+0) and 1 (0+1). Because they have the same complexity, it does not matter which one is chosen as the highest occurring. In this example, we will choose tuple 1>0.

Figure 12:
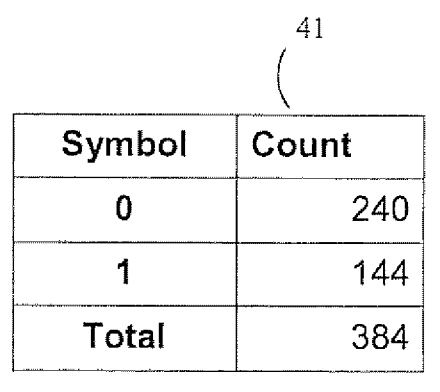

We also count the number of instances of each of the symbols in the current alphabet as seen in table 41, FIG. 12. The total symbol count in the data stream is 384 total symbols that represent 384 bits in the original data. Also, the symbol 0 appears 240 times in original data stream 30, FIG. 9, while the symbol 1 only appears 144 times.

Pass 1

In this next pass, we replace the most highly occurring tuple from the previous pass with a new symbol, and then we determine whether we have achieved our compression goal.

Creating a Symbol for the Highly Occurring Tuple

Figure 13:
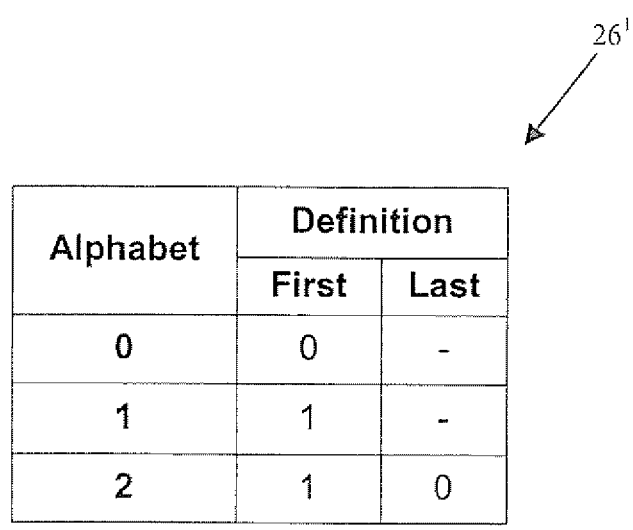

We replace the most highly occurring tuple from the previous pass with a new symbol and add it to the alphabet. Continuing the example, we add a new symbol 2 to the dictionary and define it with the tuple defined as 1 followed by 0 (1>0). It is added to the dictionary 26' as seen in FIG. 13. (Of course, original symbol 0 is still defined as a 0, while original symbol 1 is still defined as a 1. Neither of these represent a first symbol followed a last symbol which is why dashes appear in the dictionary 26' under "Last" for each of them.)

Replacing the Tuple with the New Symbol

In the original data stream 30, every instance of the tuple 1>0 is now replaced with the new, single symbol. In our example data stream 30, FIG. 9, the 96 instances of the tuple 1>0 have been replaced with the new symbol "2" to create the output data stream 30', FIG. 14, that we will use for this pass. As skilled artisans will observe, replacing ninety-six double instances of symbols with a single, new symbol shrinks or compresses the data stream 30' in comparison to the original data stream 30, FIG. 8.

Encoding the Alphabet

After we compress the data stream by using the new symbol, we use a path-weighted Huffman coding scheme to assign bits to each symbol in the current alphabet.

Figure 15:
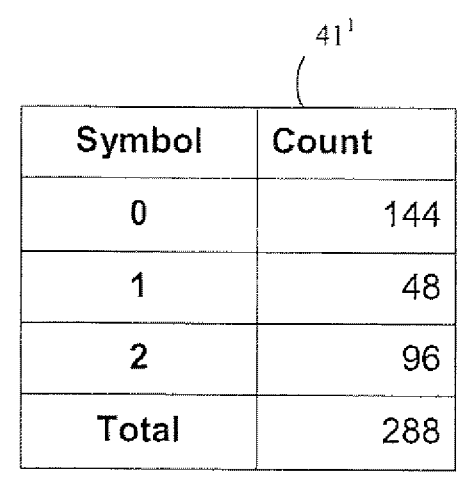

To do this, we again count the number of instances of each of the symbols in the current alphabet (now having "0," "1" and "2.") The total symbol count in the data stream is 288 symbols as seen in table 41', FIG. 15. We also have one end-of-file (EOF) symbol at the end of the data stream (not shown).

Next, we use the counts to build a Huffman binary code tree. 1) List the symbols from highest count to lowest count. 2) Combine the counts for the two least frequently occurring symbols in the dictionary. This creates a node that has the value of the sum of the two counts. 3) Continue combining the two lowest counts in this manner until there is only one symbol remaining. This generates a Huffman binary code tree.

Finally, label the code tree paths with zeros (0s) and ones (1s). The Huffman coding scheme assigns shorter code words to the more frequent symbols, which helps reduce the size length of the encoded data. The Huffman code for a symbol is defined as the string of values associated with each path transition from the root to the symbol terminal node.

Figure 16:
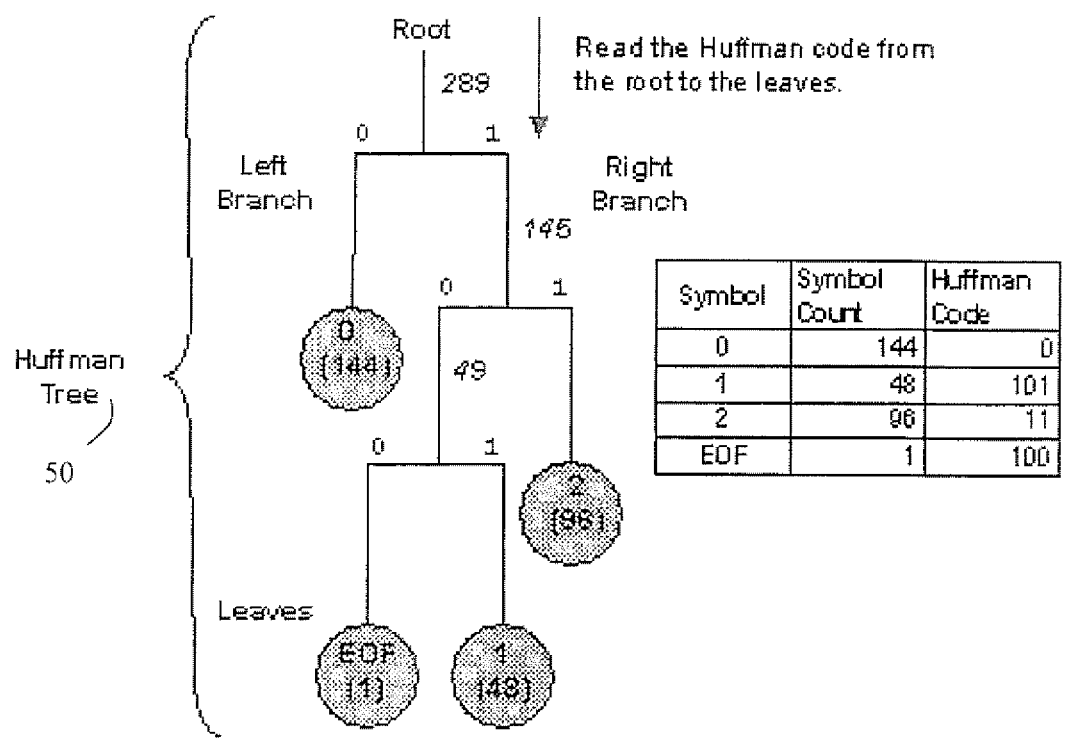

With reference to FIG. 16, the tree 50 demonstrates the process of building the Huffman tree and code for the symbols in the current alphabet. We also create a code for the end of file marker that we placed at the end of the data stream when we counted the tuples. In more detail, the root contemplates 289 total symbols, i.e., the 288 symbols for the alphabet "0," "1" and "2" plus one EOF symbol. At the leaves, the "0" is shown with its counts 144, the "1" with its count of 48, the "2" with its count of 96 and the EOF with its count of 1. Between the leaves and root, the branches define the count in a manner skilled artisans should readily understand.

In this compression procedure, we will re-build a Huffman code tree every time we add a symbol to the current dictionary. This means that the Huffman code for a given symbol can change with every compression pass.

Calculating the Compressed File Size

From the Huffman tree, we use its code to evaluate the amount of space needed to store the compressed data as seen in table 52, FIG. 17. First, we count the number of bits in the Huffman code for each symbol to find its bit length 53. Next, we multiply a symbol's bit length by its count 54 to calculate the total bits 55 used to store the occurrences of that symbol. We add the total bits 56 needed for all symbols to determine how many bits are needed to store only the compressed data. As seen, the current data stream 30', FIG. 14 requires 483 bits to store only the information.

Figure 18:

To know whether we achieved optimal compression, we must consider the total amount of space that it takes to store the compressed data plus the information about the compression that we need to store in order to decompress the data later. We also must store information about the file, the dictionary, and the Huffman tree. The table 57 in FIG. 18 shows the total compression overhead as being 25 bits, which brings the compressed size of the data stream to 508 bits, or 483 bits plus 25 bits.

Determining Whether the Compression Goal has been Achieved

Figure 19:

Finally, we compare the original number of bits (384, FIG. 12) to the current number of bits (508) that are needed for this compression pass. We find that it takes 1.32 times as many bits to store the compressed data as it took to store the original data, table 58, FIG. 19. This is not compression at all, but expansion.

In early passes, however, we expect to see that the substitution requires more space than the original data because of the effect of carrying a dictionary, adding symbols, and building a tree. On the other hand, skilled artisans should observe an eventual reduction in the amount of space needed as the compression process continues. Namely, as the size of the data set decreases by the symbol replacement method, the size grows for the symbol dictionary and the Huffman tree information that we need for decompressing the data.

Pass 2

In this pass, we replace the most highly occurring tuple from the previous pass (pass 1) with still another new symbol, and then we determine whether we have achieved our compression goal.

Identifying all Possible Tuples

As a result of the new symbol, the tuple array is expanded by adding the symbol that was created in the previous pass. Continuing our example, we add 2 as a first symbol and last symbol, and enter the tuples in the new cells of table 35', FIG. 20.

Determining the Highly Occurring Tuple

Figure 14:
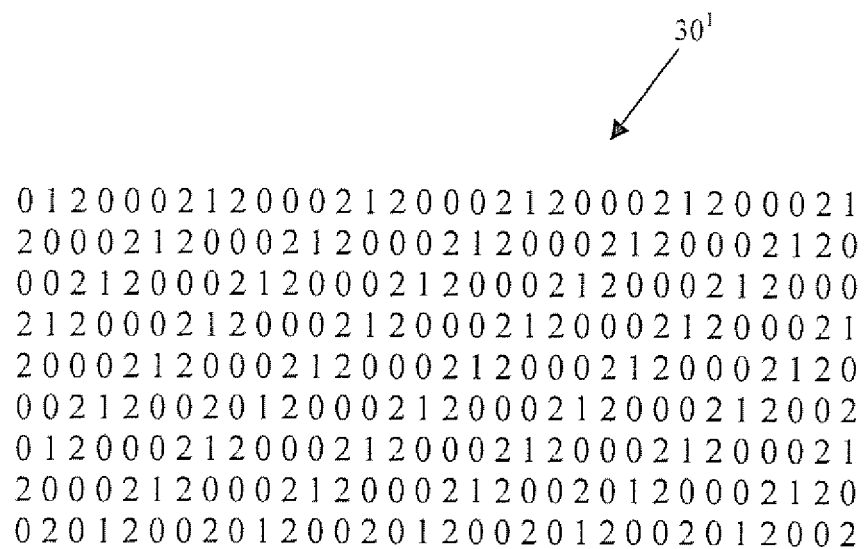

As before, the tuple array identifies the tuples that we look for and tally in our revised alphabet. As seen in table 40', FIG. 21, the Total Symbol Count=288. The tuple that occurs most frequently when counting the data stream 30', FIG. 14, is the character 2 followed by the character 0 (2>0). It occurs 56 times as seen circled in table 40', FIG. 21.

Creating a Symbol for the Highly Occurring Tuple

We define still another new symbol "3" to represent the most highly occurring tuple 2>0, and add it to the dictionary 26", FIG. 22, for the alphabet that was developed in the previous passes.

Replacing the Tuple with the New Symbol

Figure 23:

In the data stream 30', FIG. 14, we replace every instance of the most highly occurring tuple with the new single symbol. We replace the 56 instances of the 2>0 tuple with the symbol 3 and the resultant data stream 30' is seen in FIG. 23.

Encoding the Alphabet

Figure 24:
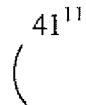

As demonstrated above, we count the number of symbols in the data stream, and use the count to build a Huffman tree and code for the current alphabet. The total symbol count has been reduced from 288 to 234 (e.g., 88+48+40+58, but not including the EOF marker) as seen in table 41", FIG. 24.

Calculating the Compressed File Size

We need to evaluate whether our substitution reduces the amount of space that it takes to store the data. As described above, we calculate the total bits needed (507) as in table 52', FIG. 25.

Figure 26:
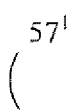

In table 57', FIG. 26, the compression overhead is calculated as 38 bits.

Determining Whether the Compression Goal has been Achieved

Finally, we compare the original number of bits (384) to the current number of bits (545=507+38) that are needed for this compression pass. We find that it takes 141% or 1.41 times as many bits to store the compressed data as it took to store the original data. Compression is still not achieved and the amount of data in this technique is growing larger rather than smaller in comparison to the previous pass requiring 132%.

Pass 3

In this pass, we replace the most highly occurring tuple from the previous pass with a new symbol, and then we determine whether we have achieved our compression goal.

Identifying all Possible Tuples

We expand the tuple array 35", FIG. 28 by adding the symbol that was created in the previous pass. We add the symbol "3" as a first symbol and last symbol, and enter the tuples in the new cells.

Determining the Highly Occurring Tuple

Figure 29:
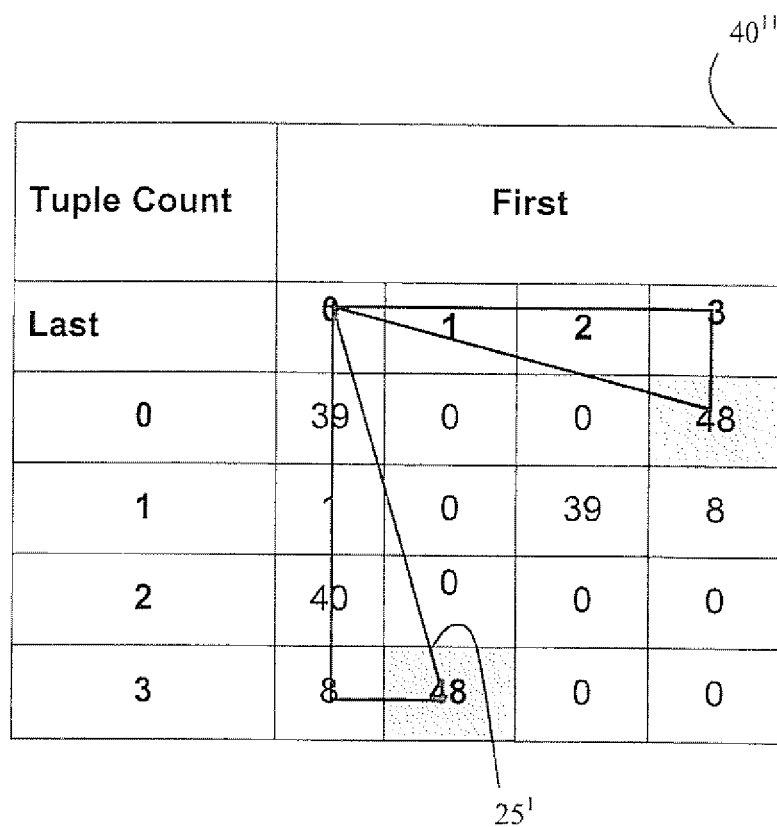

The tuple array identifies the tuples that we look for and tally in our revised alphabet. In table 40", FIG. 29, the Total Symbol Count is 232, and the tuple that occurs most frequently is the character 1 followed by character 3 (1>3). It occurs 48 times, which ties with the tuple of character 3 followed by character 0. We determine that the tuple 1>3 is the most complex tuple because it has a hypotenuse length 25' of 3.16 ($SQRT(1^2+3^2)$), and tuple 3>0 has a hypotenuse of 3 ($SQRT(0^2+3^2)$).

Creating a Symbol for the Highly Occurring Tuple

We define a new symbol 4 to represent the most highly occurring tuple 1>3, and add it to the dictionary 26'", FIG. 30, for the alphabet that was developed in the previous passes.

Replacing the Tuple with the New Symbol

Figure 31:
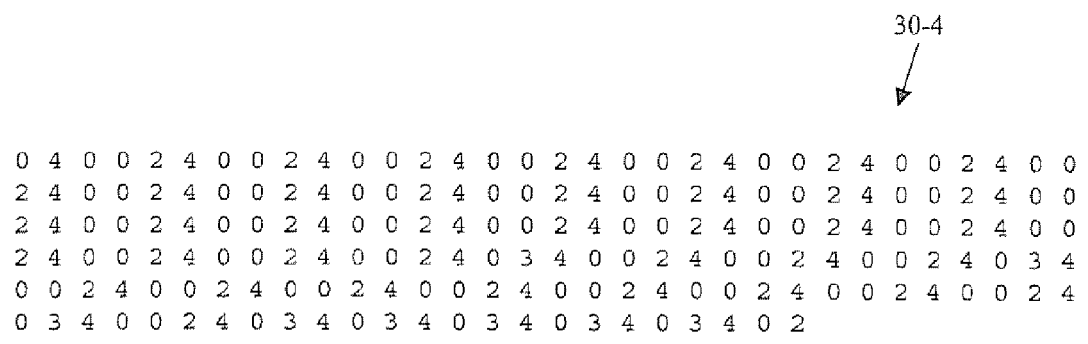

In the data stream, we replace every instance of the most highly occurring tuple from the earlier data stream with the new single symbol. We replace the 48 instances of the 1>3 tuple with the symbol 4 and new data stream 30-4 is obtained, FIG. 31.

Encoding the Alphabet

We count the number of symbols in the data stream, and use the count to build a Huffman tree and code for the current alphabet as seen in table 41', FIG. 32. There is no Huffman code assigned to the symbol 1 because there are no instances of this symbol in the compressed data in this pass. (This can be seen in the data stream 30-4, FIG. 31.) The total symbol count has been reduced from 232 to 184 (e.g., 88+40+8+48, but not including the EOF marker).

Calculating the Compressed File Size

Figure 33:
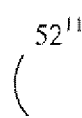

We need to evaluate whether our substitution reduces the amount of space that it takes to store the data. As seen in table 52", FIG. 33, the total bits are equal to 340.

Figure 34:
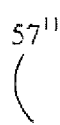

In table 57", FIG. 34, the compression overhead in bits is 42.

Determining Whether the Compression Goal has been Achieved

Finally, we compare the original number of bits (384) to the current number of bits (382) that are needed for this compression pass. We find that it takes 0.99 times as many bits to store the compressed data as it took to store the original data. Compression is achieved.

Pass 4

In this pass, we replace the most highly occurring tuple from the previous pass with a new symbol, and then we determine whether we have achieved our compression goal.

Identifying all Possible Tuples

We expand the tuple array 35'", FIG. 36, by adding the symbol that was created in the previous pass. We add the symbol 4 as a first symbol and last symbol, and enter the tuples in the new cells.

Determining the Highly Occurring Tuple

The tuple array identifies the tuples that we look for and tally in our revised alphabet. In table 40'", FIG. 37, the Total Symbol Count=184 and the tuple that occurs most frequently is the character 4 followed by character 0 (4>0). It occurs 48 times.

Creating a Symbol for the Highly Occurring Tuple

Figure 38:
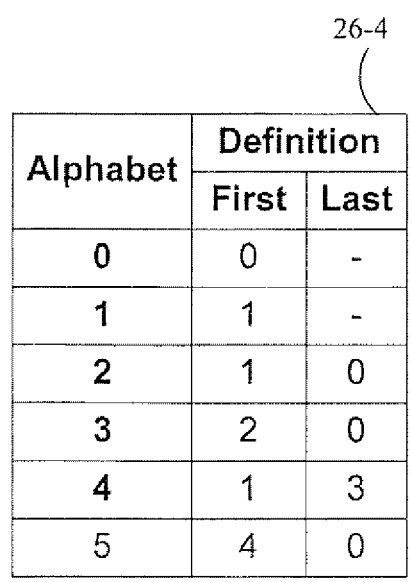

We define a new symbol 5 to represent the 4>0 tuple, and add it to the dictionary 26-4, FIG. 38, for the alphabet that was developed in the previous passes.

Replacing the Tuple with the New Symbol

Figure 39:
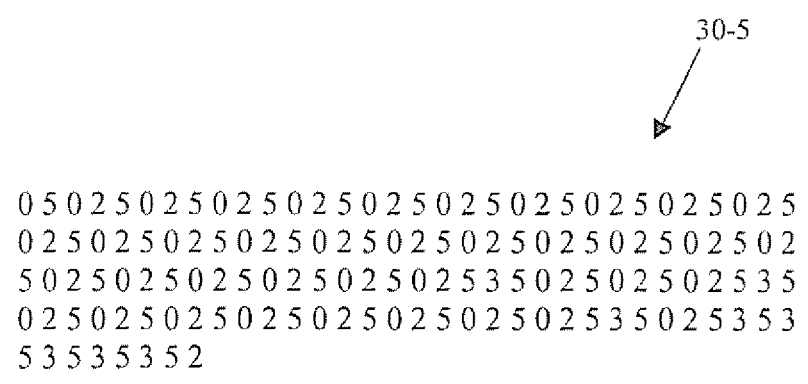

In the data stream, we replace every instance of the most highly occurring tuple with the new single symbol. We replace the 48 instances of the 40 tuple in data stream 30-4, FIG. 31, with the symbol 5 as seen in data stream 30-5, FIG. 39.

Encoding the Alphabet

As demonstrated above, we count the number of symbols in the data stream, and use the count to build a Huffman tree and code for the current alphabet. There is no Huffman code assigned to the symbol 1 and the symbol 4 because there are no instances of these symbols in the compressed data in this pass. The total symbol count has been reduced from 184 to 136 (e.g., 40+0+40+8+0+48, but not including the EOF marker) as seen in table 41-4, FIG. 40.

Calculating the Compressed File Size

We need to evaluate whether our substitution reduces the amount of space that it takes to store the data. As seen in table 52'", FIG. 41, the total number of bits is 283.

As seen in table 57'", FIG. 42, the compression overhead in bits is 48.

Determining Whether the Compression Goal has been Achieved

Finally, we compare the original number of bits (384) to the current number of bits (331) that are needed for this compression pass as seen in table 58'", FIG. 43. In turn, we find that it takes 0.86 times as many bits to store the compressed data as it took to store the original data.

Pass 5

In this pass, we replace the most highly occurring tuple from the previous pass with a new symbol, and then we determine whether we have achieved our compression goal.

Identifying all Possible Tuples

We expand the tuple array by adding the symbol that was created in the previous pass. We add the symbol 5 as a first symbol and last symbol, and enter the tuples in the new cells as seen in table 35-4, FIG. 44.

Determining the Highly Occurring Tuple

The tuple array identifies the tuples that we look for and tally in our revised alphabet as seen in table 40-4, FIG. 45. (Total Symbol Count=136) The tuple that occurs most frequently is the symbol 2 followed by symbol 5 (2>5), which has a hypotenuse of 5.4. It occurs 39 times. This tuple ties with the tuple 0>2 (hypotenuse is 2) and 5>0 (hypotenuse is 5). The tuple 2>5 is the most complex based on the hypotenuse length 25" described above.

Creating a Symbol for the Highly Occurring Tuple

We define a new symbol 6 to represent the most highly occurring tuple 2>5, and add it to the dictionary for the alphabet that was developed in the previous passes as seen in table 26-5, FIG. 46.

Replacing the Tuple with the New Symbol

In the data stream, we replace every instance of the most highly occurring tuple with the new single symbol. We replace the 39 instances of the 2>5 tuple in data stream 30-5, FIG. 39, with the symbol 6 as seen in data stream 30-6, FIG. 47.

Encoding the Alphabet

Figure 49:
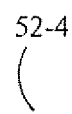

As demonstrated above, we count the number of symbols in the data stream, and use the count to build a Huffman tree and code for the current alphabet as seen in table 41-5, FIG. 48. There is no Huffman code assigned to the symbol 1 and the symbol 4 because there are no instances of these symbols in the compressed data in this pass. The total symbol count has been reduced from 136 to 97 (e.g., 40+1+8+9+39, but not including the EOF marker) as seen in table 52-4, FIG. 49.

Calculating the Compressed File Size

We need to evaluate whether our substitution reduces the amount of space that it takes to store the data. As seen in table 52-4, FIG. 49, the total number of bits is 187.

Figure 50:
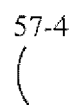

As seen in table 57-4, FIG. 50, the compression overhead in bits is 59.

Determining Whether the Compression Goal has been Achieved

Finally, we compare the original number of bits (384) to the current number of bits (246, or 187+59) that are needed for this compression pass as seen in table 58-4, FIG. 51. We find that it takes 0.64 times as many bits to store the compressed data as it took to store the original data.

Pass 6

In this pass, we replace the most highly occurring tuple from the previous pass with a new symbol, and then we determine whether we have achieved our compression goal.

Identifying all Possible Tuples

We expand the tuple array 35-5 by adding the symbol that was created in the previous pass as seen in FIG. 52. We add the symbol 6 as a first symbol and last symbol, and enter the tuples in the new cells.

Determining the Highly Occurring Tuple

The tuple array identifies the tuples that we look for and tally in our revised alphabet. (Total Symbol Count=97) The tuple that occurs most frequently is the symbol 0 followed by symbol 6 (0>6). It occurs 39 times as seen in table 40-5, FIG. 53.

Creating a Symbol for the Highly Occurring Tuple

We define a new symbol 7 to represent the 0>6 tuple, and add it to the dictionary for the alphabet that was developed in the previous passes as seen in table 26-6, FIG. 54.

Replacing the Tuple with the New Symbol

Figure 55:

In the data stream, we replace every instance of the most highly occurring tuple with the new single symbol. We replace the 39 instances of the 0>6 tuple in data stream 30-6, FIG. 47, with the symbol 7 as seen in data stream 30-7, FIG. 55.

Encoding the Alphabet

As demonstrated above, we count the number of symbols in the data stream, and use the count to build a Huffman tree and code for the current alphabet as seen in table 41-6, FIG. 56. There is no Huffman code assigned to the symbol 1, symbol 4 and symbol 6 because there are no instances of these symbols in the compressed data in this pass. The total symbol count has been reduced from 97 to 58 (e.g., 1+0+1+8+0+9+0+39, but not including the EOF marker).

Figure 57:
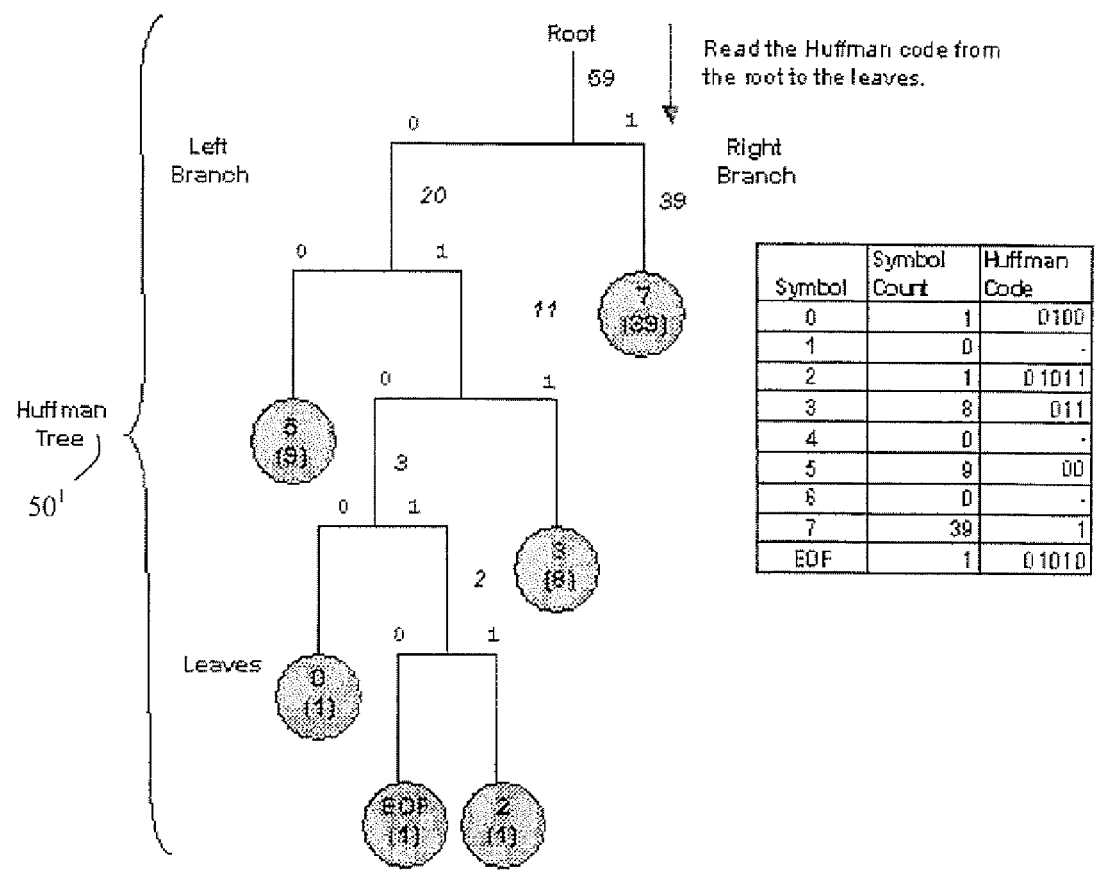

Because all the symbols 1, 4, and 6 have been removed from the data stream, there is no reason to express them in the encoding scheme of the Huffman tree 50', FIG. 57. However, the extinct symbols will be needed in the decode table. A complex symbol may decode to two less complex symbols. For example, a symbol 7 decodes to 0>6.

We need to evaluate whether our substitution reduces the amount of space that it takes to store the data. As seen in table 52-5, FIG. 58, the total number of bits is 95.

As seen in table 57-5, FIG. 59, the compression overhead in bits is 71.

Determining Whether the Compression Goal has been Achieved

Figure 60:
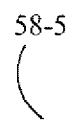

Finally, we compare the original number of bits (384) to the current number of bits (166, or 95+71) that are needed for this compression pass as seen in table 58-5, FIG. 60. We find that it takes 0.43 times as many bits to store the compressed data as it took to store the original data.

Subsequent Passes

Figure 61:
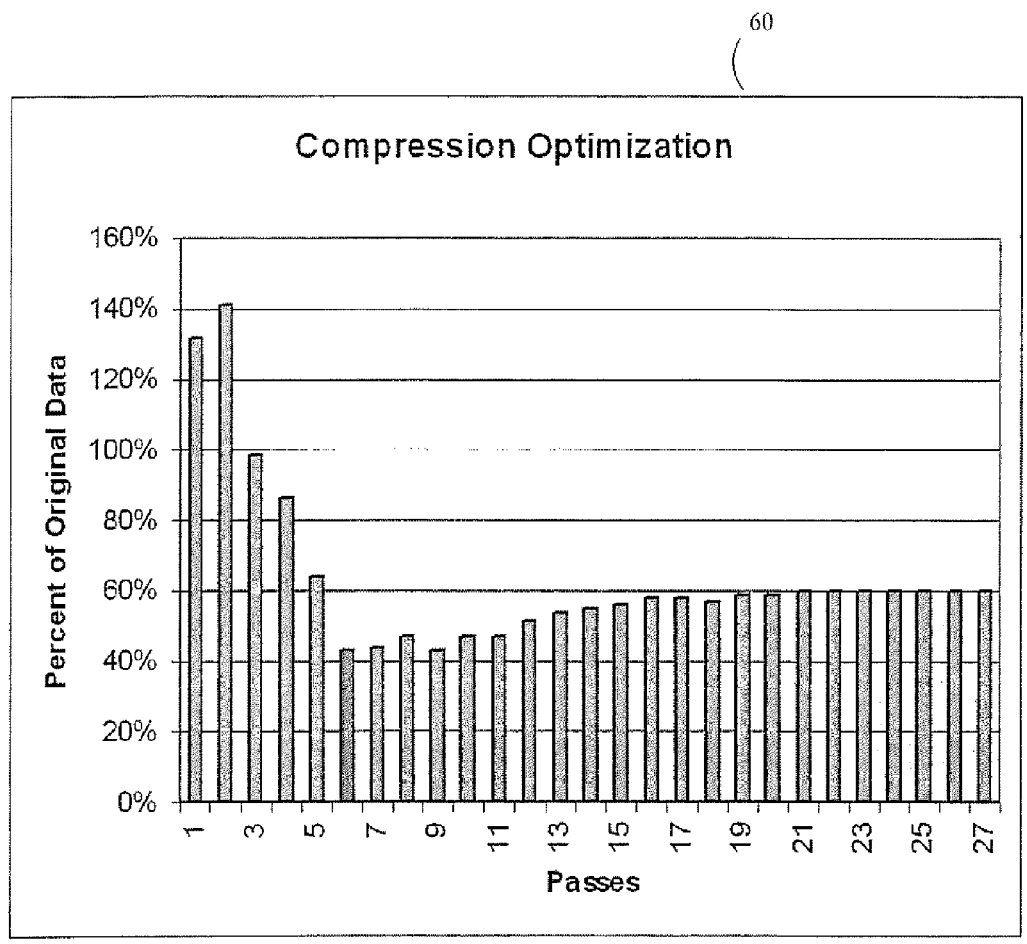
FIG. 61 is a chart in accordance with the present invention showing compression optimization.

Skilled artisans will also notice that overhead has been growing in size while the total number of bits is still decreasing. We repeat the procedure to determine if this is the optimum compressed file size. We compare the compression size for each subsequent pass to the first occurring lowest compressed file size. The chart 60, FIG. 61, demonstrates how the compressed file size grows, decreases, and then begins to grow as the encoding information and dictionary sizes grow. We can continue the compression of the foregoing techniques until the text file compresses to a single symbol after 27 passes.

Interesting Symbol Statistics

With reference to table 61, FIG. 62, interesting statistics about the symbols for this compression are observable. For instance, the top 8 symbols represent 384 bits (e.g., 312+45+24+2+1) and 99.9% (e.g., 81.2+11.7+6.2+0.5+0.3%) of the file.

Storing the Compressed File

The information needed to decompress a file is usually written at the front of a compressed file, as well as to a separate dictionary only file. The compressed file contains information about the file, a coded representation of the Huffman tree that was used to compress the data, the dictionary of symbols that was created during the compression process, and the compressed data. The goal is to store the information and data in as few bits as possible.

This section describes a method and procedure for storing information in the compressed file.

File Type

The first four bits in the file are reserved for the version number of the file format, called the file type. This field allows flexibility for future versions of the software that might be used to write the encoded data to the storage media. The file type indicates which version of the software was used when we saved the file in order to allow the file to be decompressed later.

Four bits allows for up to 16 versions of the software. That is, binary numbers from 0000 to 1111 represent version numbers from 0 to 15. Currently, this field contains binary 0000.

Maximum Symbol Width

The second four bits in the file are reserved for the maximum symbol width. This is the number of bits that it takes to store in binary form the largest symbol value. The actual value stored is four less than the number of bits required to store the largest symbol value in the compressed data. When we read the value, we add four to the stored number to get the actual maximum symbol width. This technique allows symbol values up to 20 bits. In practical terms, the value 2^20 (2 raised to the $20^{th}$ power) means that about 1 million symbols can be used for encoding.

For example, if symbols 0-2000 might appear in the compressed file, the largest symbol ID (2000) would fit in a field containing 11 bits. Hence, a decimal 7 (binary 0111) would be stored in this field.

In the compression example, the maximum symbol width is the end-of-file symbol 8, which takes four bits in binary (1000). We subtract four, and store a value of 0000. When we decompress the data, we add four to zero to find the maximum symbol width of four bits. The symbol width is used to read the Huffman tree that immediately follows in the coded data stream.

Coded Huffman Tree

We must store the path information for each symbol that appears in the Huffman tree and its value. To do this, we convert the symbol's digital value to binary. Each symbol will be stored in the same number of bits, as determined by the symbol with the largest digital value and stored as the just read "symbol width".

In the example, the largest symbol in the dictionary in the Huffman encoded tree is the end-of-file symbol 8. The binary form of 8 is 1000, which takes 4 bits. We will store each of the symbol values in 4 bits.

To store a path, we will walk the Huffman tree in a method known as a pre-fix order recursive parse, where we visit each node of the tree in a known order. For each node in the tree one bit is stored. The value of the bit indicates if the node has children (1) or if it is a leaf with no children (0). If it is a leaf, we also store the symbol value. We start at the root and follow the left branch down first. We visit each node only once. When we return to the root, we follow the right branch down, and repeat the process for the right branch.

Figure 63:
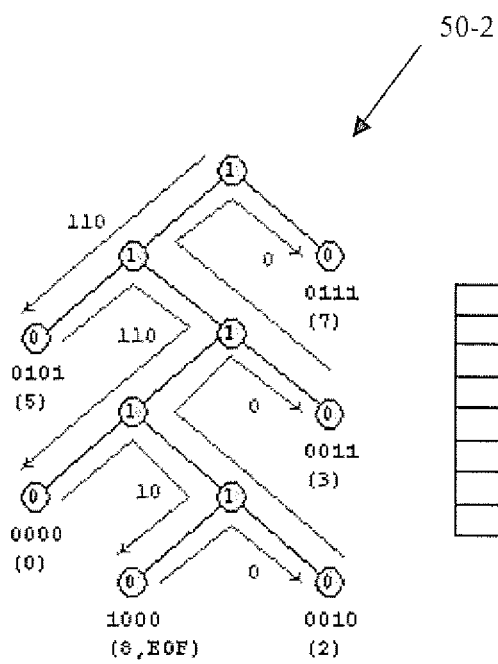

In the following example, the Huffman encoded tree is redrawn as 50-2 to illustrate the prefix-order parse, where nodes with children are labeled as 1, and leaf nodes are labeled as 0 as seen in FIG. 63.

The discovered paths and symbols are stored in the binary form in the order in which they are discovered in this method of parsing. Write the following bit string to the file, where the bits displayed in bold/underline represent the path, and the value of the 0 node are displayed without bold/underline. The spaces are added for readability; they are not written to media.
110 0101 110 0000 10 1000 0 0010 0 0011 0 0111

Encode Array for the Dictionary

The dictionary information is stored as sequential first/last definitions, starting with the two symbols that define the symbol 2. We can observe the following characteristics of the dictionary:

The symbols 0 and 1 are the atomic (non-divisible) symbols common to every compressed file, so they do not need to be written to media.

Because we know the symbols in the dictionary are sequential beginning with 2, we store only the symbol definition and not the symbol itself.

A symbol is defined by the tuple it replaces. The left and right symbols in the tuple are naturally symbols that precede the symbol they define in the dictionary.

We can store the left/right symbols of the tuple in binary form.

We can predict the maximum number of bits that it takes to store numbers in binary form. The number of bits used to store binary numbers increases by one bit with each additional power of two as seen, for example, in table 62, FIG. 64:

Because the symbol represents a tuple made up of lower-level symbols, we will increase the bit width at the next higher symbol value; that is, at 3, 5, 9, and 17, instead of at 2, 4, 8, and 16.

We use this information to minimize the amount of space needed to store the dictionary. We store the binary values for the tuple in the order of first and last, and use only the number of bits needed for the values.

Three dictionary instances have special meanings. The 0 and 1 symbols represent the atomic symbols of data binary 0 binary 1, respectively. The last structure in the array represents the end-of-file (EOF) symbol, which does not have any component pieces. The EOF symbol is always assigned a value that is one number higher than the last symbol found in the data stream.

Figure 65:

Continuing our compression example, the table 63, FIG. 65, shows how the dictionary is stored.

Write the following bit string to the file. The spaces are added for readability; they are not written to media.
10 1000 0111 100000 010101 000110

Encoded Data

To store the encoded data, we replace the symbol with its matching Huffman code and write the bits to the media. At the end of the encoded bit string, we write the EOF symbol. In our example, the final compressed symbol string is seen again as 30-7, FIG. 66, including the EOF.

The Huffman code for the optimal compression is shown in table 67, FIG. 67.

As we step through the data stream, we replace the symbol with the Huffman coded bits as seen at string 68, FIG. 68. For example, we replace symbol 0 with the bits 0100 from table 67, replace symbol 5 with 00 from table 67, replace instances of symbol 7 with 1, and so on. We write the following string to the media, and write the end of file code at the end. The bits are separated by spaces for readability; the spaces are not written to media.

The compressed bit string for the data, without spaces is:
010000111111111111111111111111111101100111011001-1111111011001011000110001
10001100011000101101010

Overview of the Stored File

Figure 69:
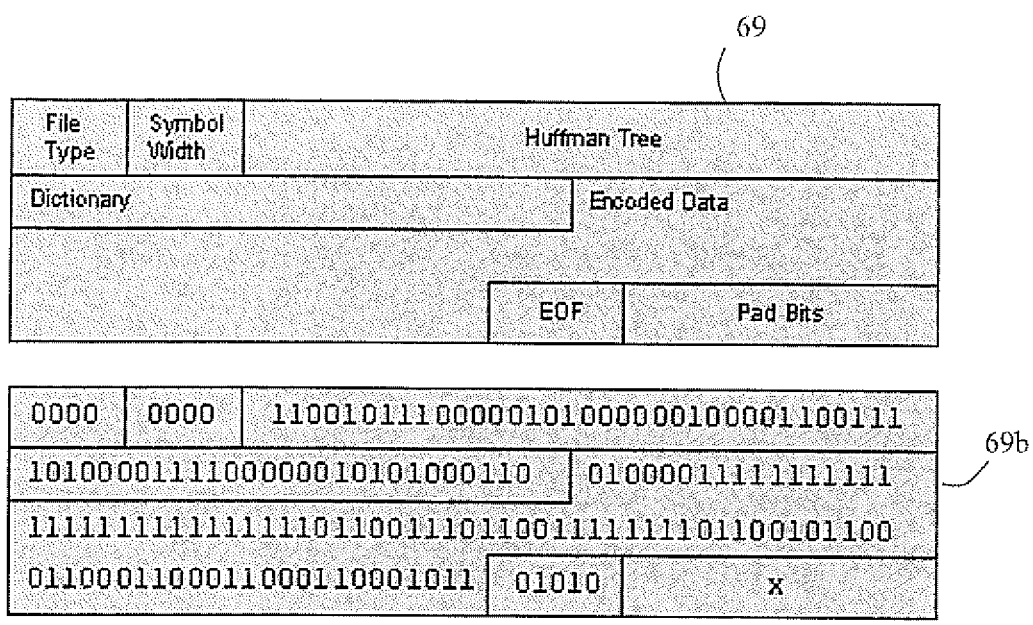

As summarized in the diagram 69, FIG. 69, the information stored in the compressed file is the file type, symbol width, Huffman tree, dictionary, encoded data, and EOF symbol. After the EOF symbol, a variable amount of pad bits are added to align the data with the final byte in storage.

Figure 70:

In the example, the bits 70 of FIG. 70 are written to media. Spaces are shown between the major fields for readability; the spaces are not written to media. The "x" represents the pad bits. In FIG. 69, the bits 70 are seen filled into diagram 69b corresponding to the compressed file format.

Decompressing the Compressed File

The process of decompression unpacks the data from the beginning of the file 69, FIG. 69, to the end of the stream.

File Type

Read the first four bits of the file to determine the file format version.

Maximum Symbol Width

Read the next four bits in the file, and then add four to the value to determine the maximum symbol width. This value is needed to read the Huffman tree information.

Huffman Tree

Reconstruct the Huffman tree. Each 1 bit represents a node with two children. Each 0 bit represents a leaf node, and it is immediately followed by the symbol value. Read the number of bits for the symbol using the maximum symbol width.

In the example, the stored string for Huffman is:
110010111000001010000001000011100111

Figure 71:
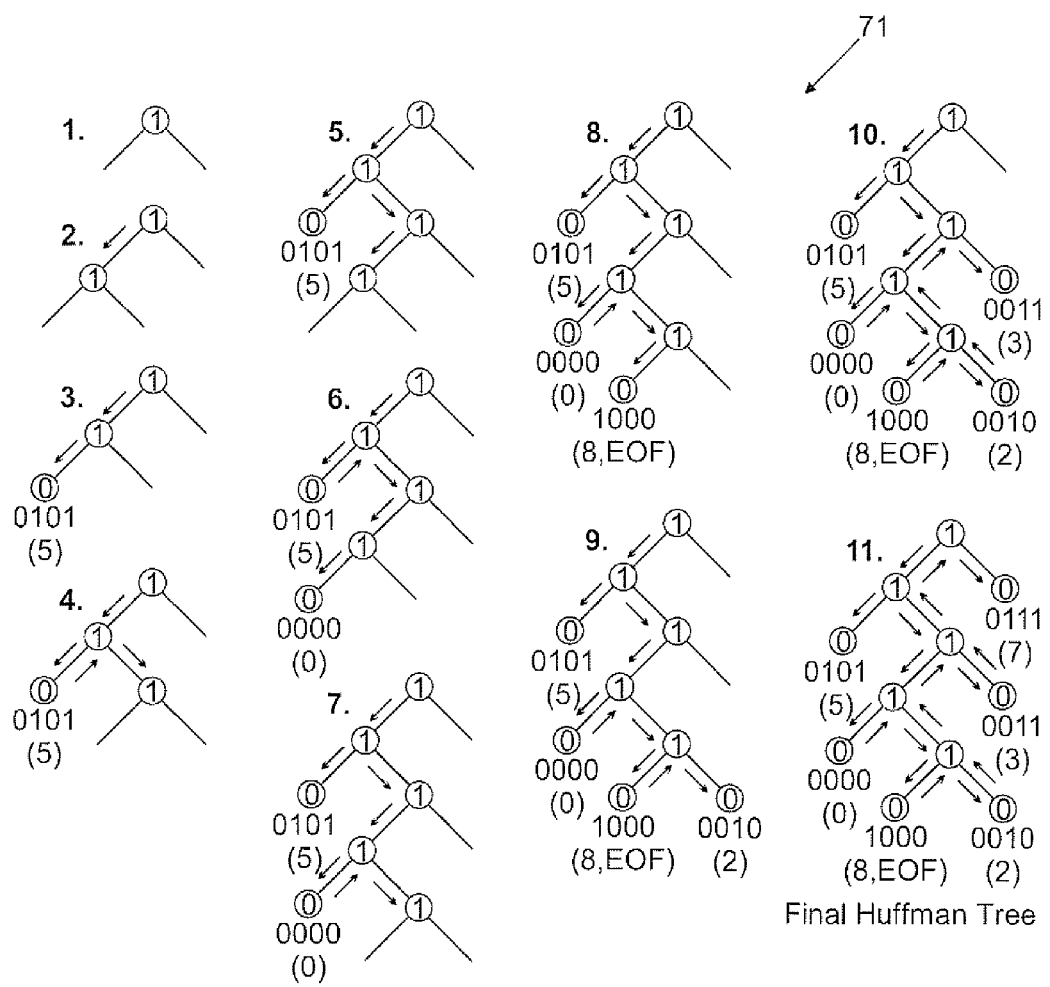

With reference to FIG. 71, diagram 71 illustrates how to unpack and construct the Huffman tree using the pre-fix order method.

Dictionary

Figure 72:
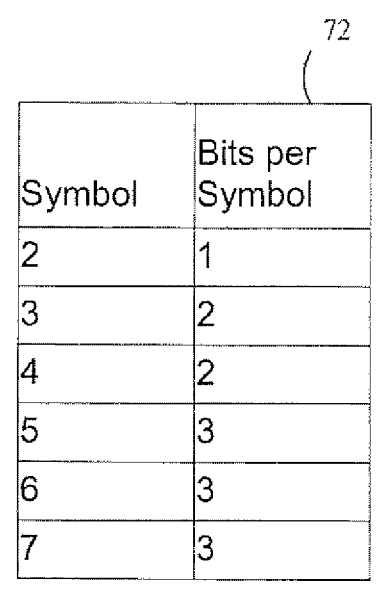

To reconstruct the dictionary from file 69, read the values for the pairs of tuples and populate the table. The values of 0 and 1 are known, so they are automatically included. The bits are read in groups based on the number of bits per symbol at that level as seen in table 72, FIG. 72.

In our example, the following bits were stored in the file:
10100001111010000101010000110

We read the numbers in pairs, according to the bits per symbol, where the pairs represent the numbers that define symbols in the dictionary:

| Bits | Symbol |
| --- | --- |
| 1 0 | 2 |
| 10 00 | 3 |
| 01 11 | 4 |
| 100 000 | 5 |
| 010 101 | 6 |
| 000 110 | 7 |

We convert each binary number to a decimal number:

| Decimal Value | Symbol |
| --- | --- |
| 1 0 | 2 |
| 2 0 | 3 |
| 1 3 | 4 |
| 4 0 | 5 |
| 2 5 | 6 |
| 0 6 | 7 |

We identify the decimal values as the tuple definitions for the symbols:

| Symbol | Tuple |
| --- | --- |
| 2 | 1 > 0 |
| 3 | 2 > 0 |
| 4 | 1 > 3 |
| 5 | 4 > 0 |
| 6 | 2 > 5 |
| 7 | 0 > 6 |

We populate the dictionary with these definitions as seen in table 73, FIG. 73.

Construct the Decode Tree

Figure 74:
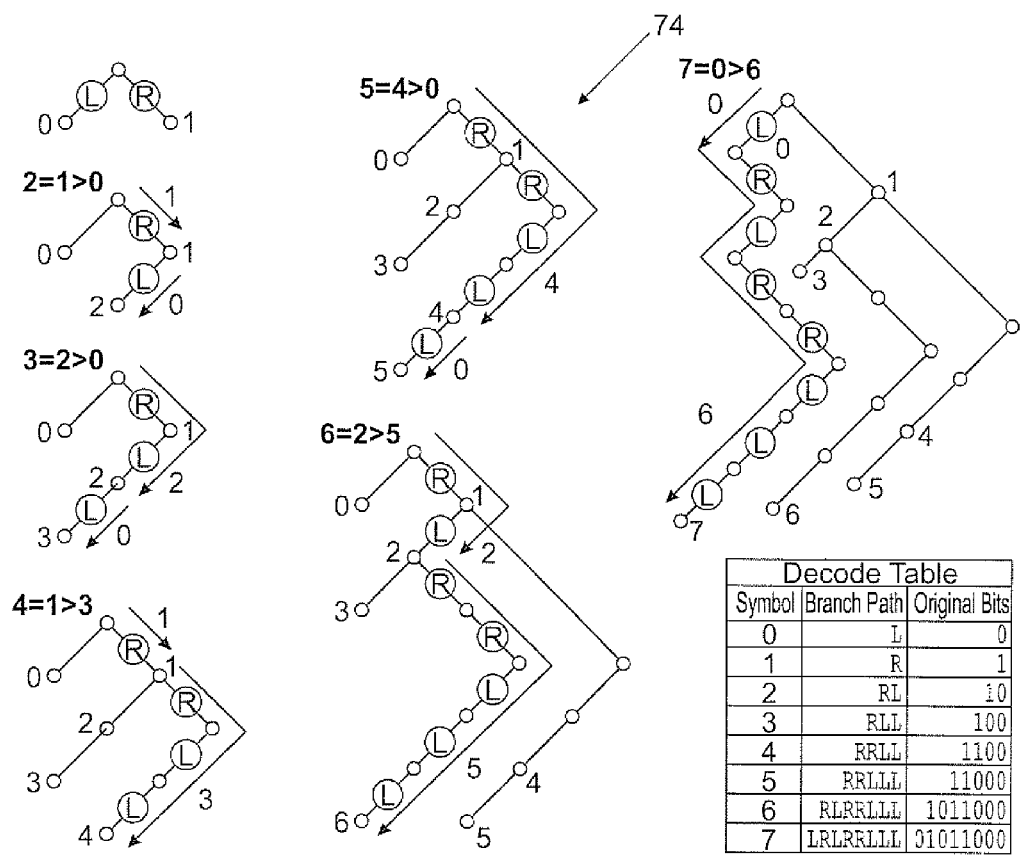

We use the tuples that are defined in the re-constructed dictionary to build the Huffman decode tree. Let's decode the example dictionary to demonstrate the process. The diagram 74 in FIG. 74 shows how we build the decode tree to determine the original bits represented by each of the symbols in the dictionary. The step-by-step reconstruction of the original bits is as follows:

Start with symbols 0 and 1. These are the atomic elements, so there is no related topic. The symbol 0 is a left branch from the root. The symbol 1 is a right branch. (Left and right are relative to the node as you are facing the diagram—that is, on your left and on your right.) The atomic elements are each represented by a single bit, so the binary path and the original path are the same. Record the original bits 0 and 1 in the decode table.

Symbol 2 is defined as the tuple 1>0 (symbol 1 followed by symbol 0). In the decode tree, go to the node for symbol 1, then add a path that represents symbol 0. That is, add a left branch at node 1. The terminating node is the symbol 2. Traverse the path from the root to the leaf to read the branch paths of left (L) and right (R). Replace each left branch with a 0 and each right path with a 1 to view the binary forum of the path as LR, or binary 10.

Symbol 3 is defined as the tuple 2>0. In the decode tree, go to the node for symbol 2, then add a path that represents symbol 0. That is, add a left branch at node 2. The terminating node is the symbol 3. Traverse the path from the root to the leaf to read the branch path of RLL. Replace each left branch with a 0 and each right path with a 1 to view the binary form of the path as 100.

Symbol 4 is defined as the tuple 1>3. In the decode tree, go to the node for symbol 1, then add a path that represents symbol 3. From the root to the node for symbol 3, the path is RLL. At symbol 1, add the RLL path. The terminating node is symbol 4. Traverse the path from the root to the leaf to read the path of RRLL, which translates to the binary format of 1100.

Symbol 5 is defined as the tuple 4>0. In the decode tree, go to the node for symbol 4, then add a path that represents symbol 0. At symbol 4, add the L path. The terminating node is symbol 5. Traverse the path from the root to the leaf to read the path of RRLLL, which translates to the binary format of 11000.

Symbol 6 is defined as the tuple 2>5. In the decode tree, go to the node for symbol 2, then add a path that represents symbol 5. From the root to the node for symbol 5, the path is RRLLL. The terminating node is symbol 6. Traverse the path from the root to the leaf to read the path of RLRRLLL, which translates to the binary format of 1011000.

Symbol 7 is defined as the tuple 0>6. In the decode tree, go to the node for symbol 0, then add a path that represents symbol 6. From the root to the node for symbol 6, the path is RLRRLLL. The terminating node is symbol 7. Traverse the path from the root to the leaf to read the path of LRLRRLLL, which translates to the binary format of 01011000.

Decompress the Data

Figure 75:
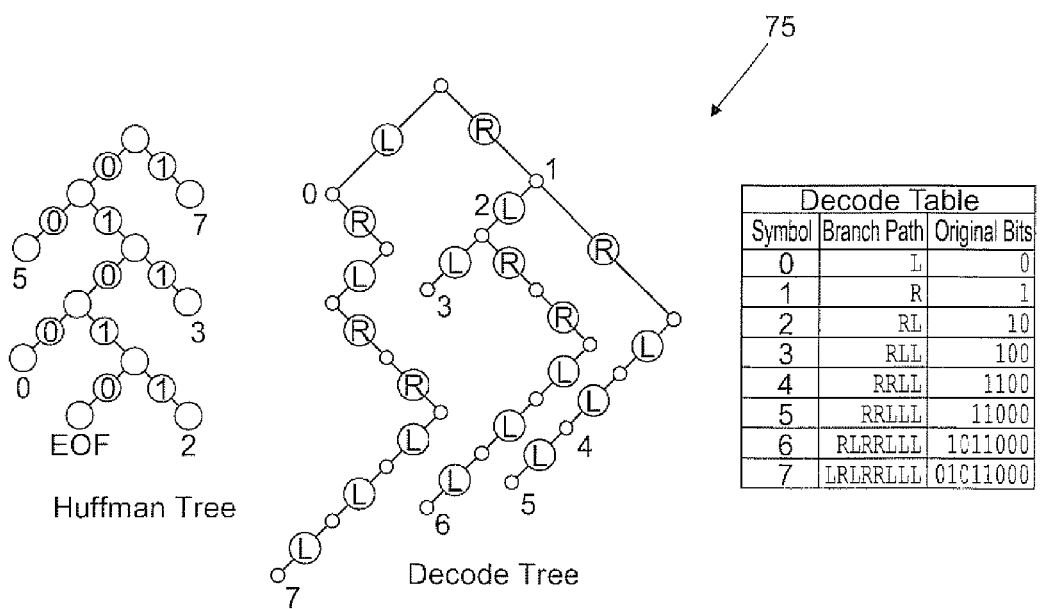

To decompress the data, we need the reconstructed Huffman tree and the decode table that maps the symbols to their original bits as seen at 75, FIG. 75. We read the bits in the data file one bit at a time, following the branching path in the Huffman tree from the root to a node that represents a symbol. The compressed file data bits are:

0100001111111111111111111111101100111011001111 11011001011000110001 100011000110001011010101010

Figure 76:
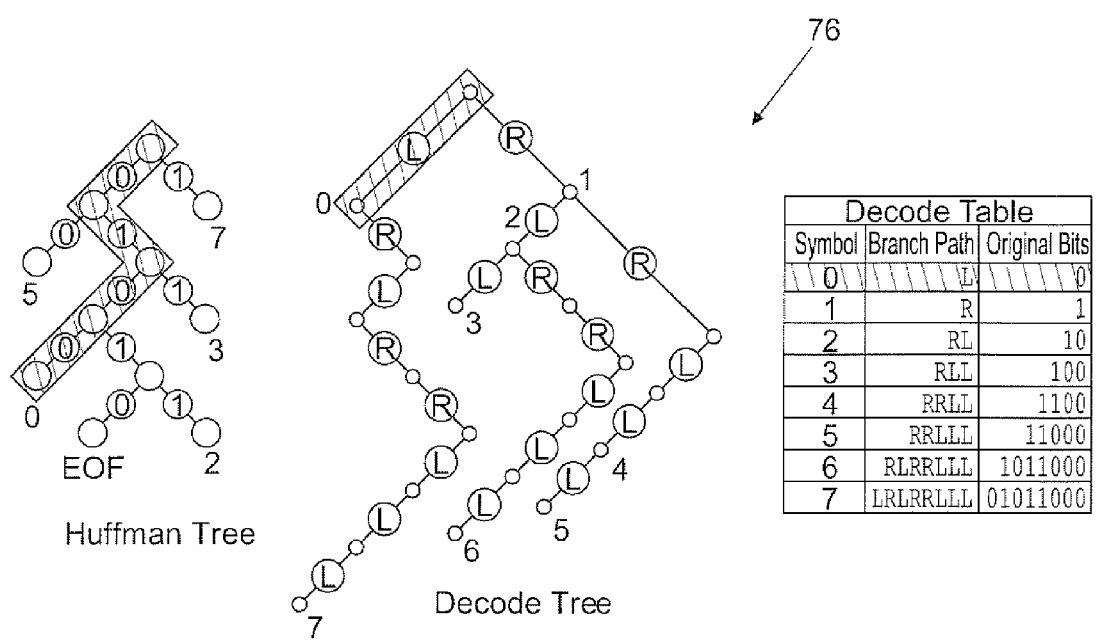

For example, the first four bits of encoded data 0100 takes us to symbol 0 in the Huffman tree, as illustrated in the diagram 76, FIG. 76. We look up 0 in the decode tree and table to find the original bits. In this case, the original bits are also 0. We replace 0100 with the single bit 0.

Figure 77:
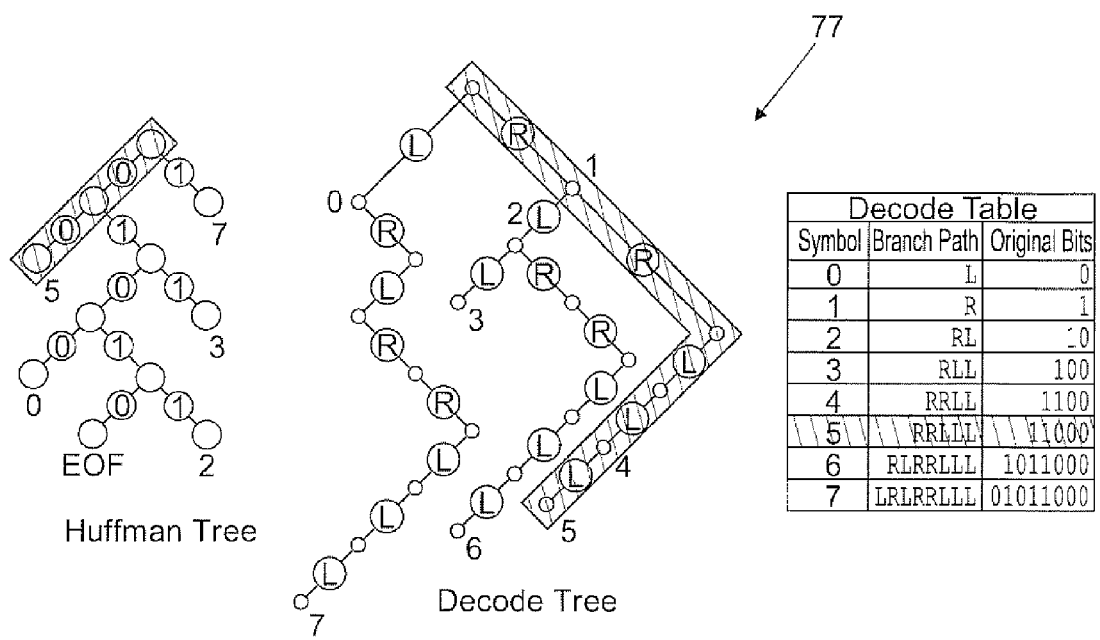

In the diagram 77 in FIG. 77, we follow the next two bits 00 to find symbol 5 in the Huffman tree. We look up 5 in the decode tree and table to find that symbol 5 represents original bits of 11000. We replace 00 with 11000.

Figure 78:
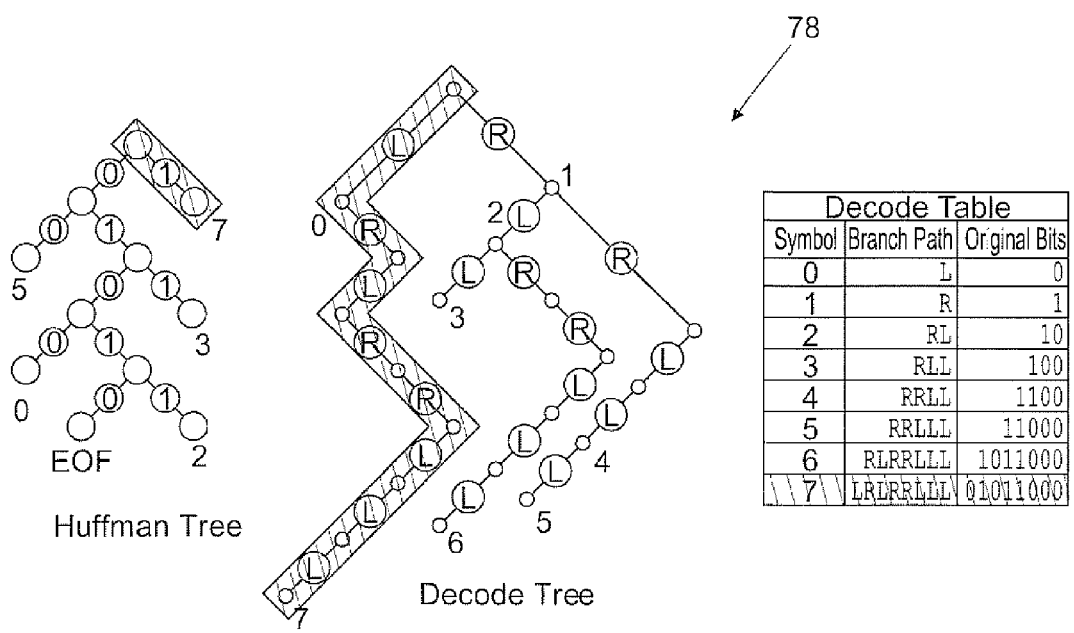

In the diagram 78, FIG. 78, we follow the next bit 1 to find symbol 7 in the Huffman tree. We look up 7 in the decode tree and table to find that symbol 7 represents the original bits 01011000. We replace the single bit 1 with 01011000. We repeat this for each 1 in the series of 1s that follow.

Figure 79:
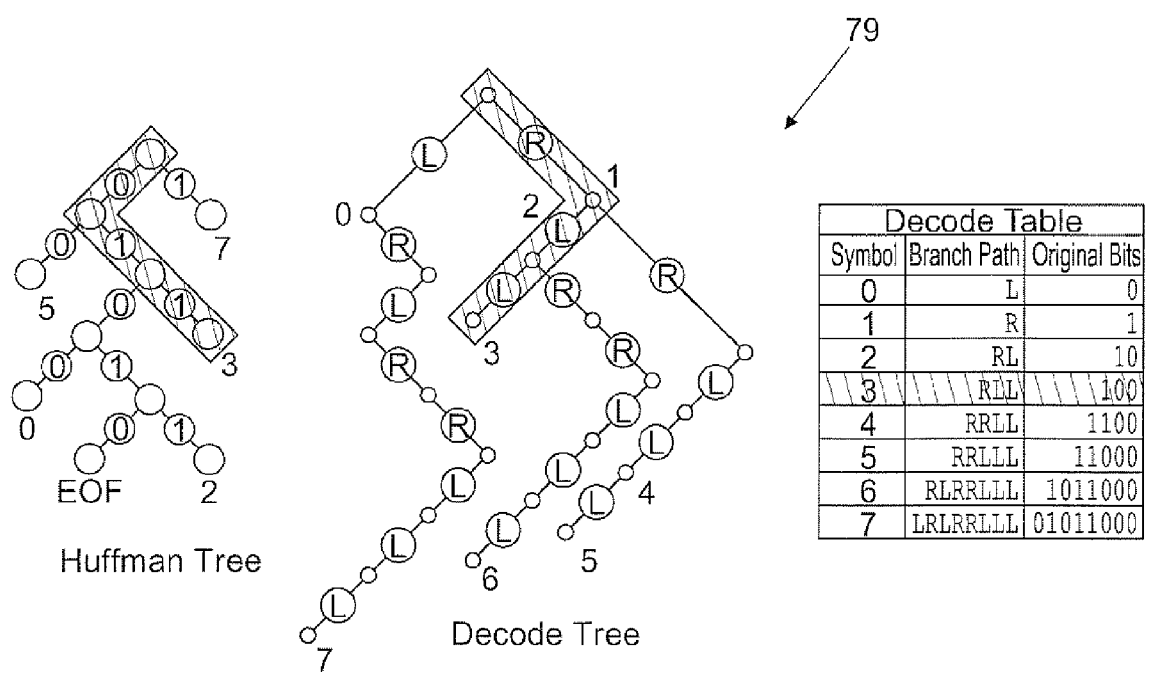

The next symbol we discover is with bits 011. We follow these bits in the Huffman tree in diagram 79, FIG. 79. We look up symbol 3 in the decode tree and table to find that it represents original bits 100, so we replace 011 with bits 100.

Figure 80:
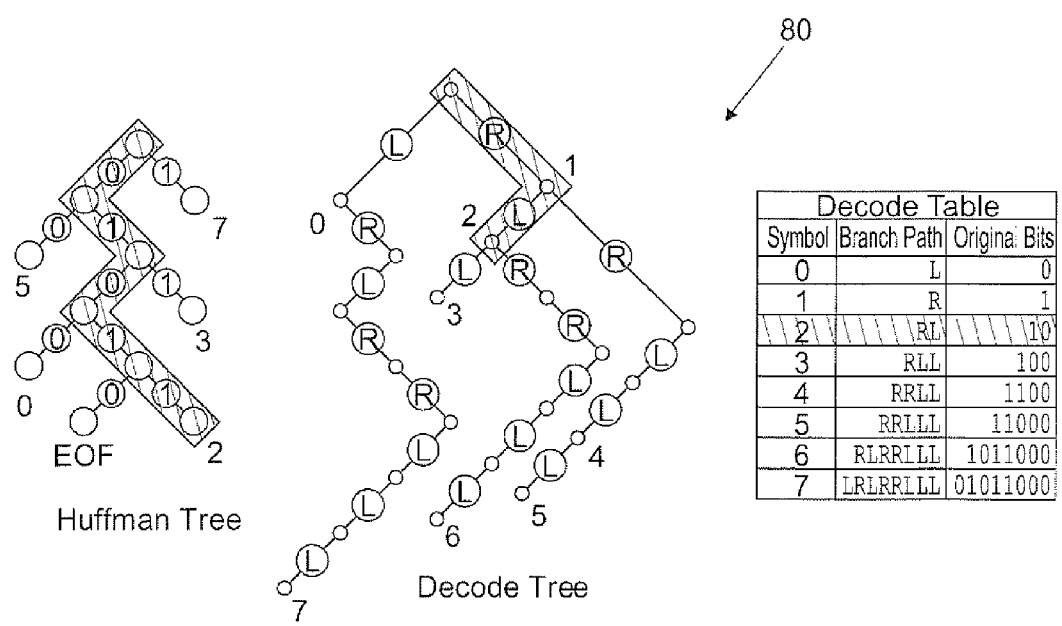

We continue the decoding and replacement process to discover the symbol 2 near the end of the stream with bits 01011, as illustrated in diagram 80, FIG. 80. We look up symbol 2 in the decode tree and table to find that it represents original bits 10, so we replace 01011 with bits 10.

Figure 81:
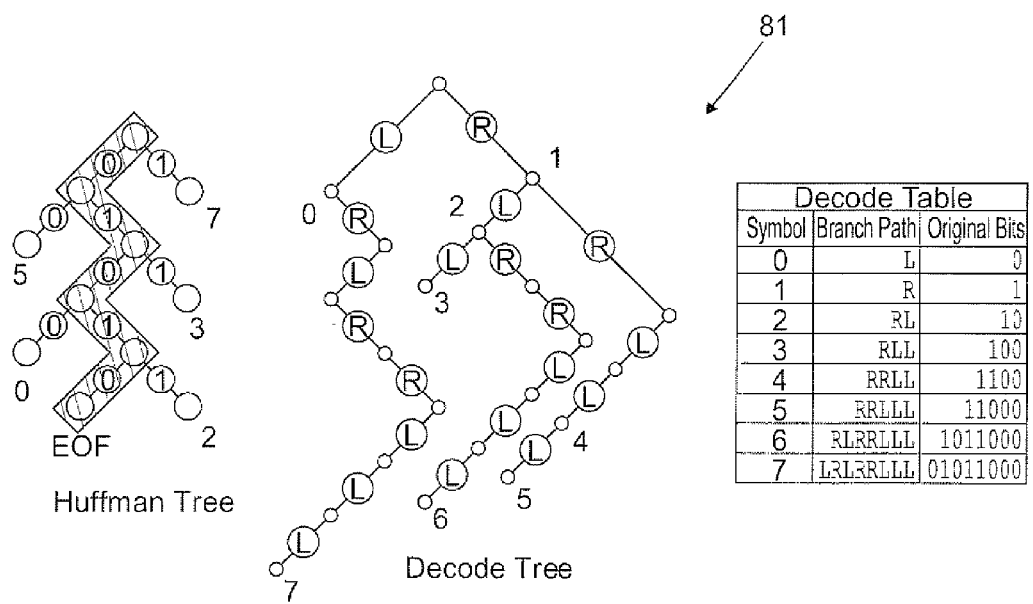

The final unique sequence of bits that we discover is the end-of-file sequence of 01010, as illustrated in diagram 81, FIG. 81. The EOF tells us that we are done unpacking.

Altogether, the unpacking of compressed bits recovers the original bits of the original data stream in the order of diagram 82 spread across two FIGS. 82*a* and 82*b*.

Figure 83:
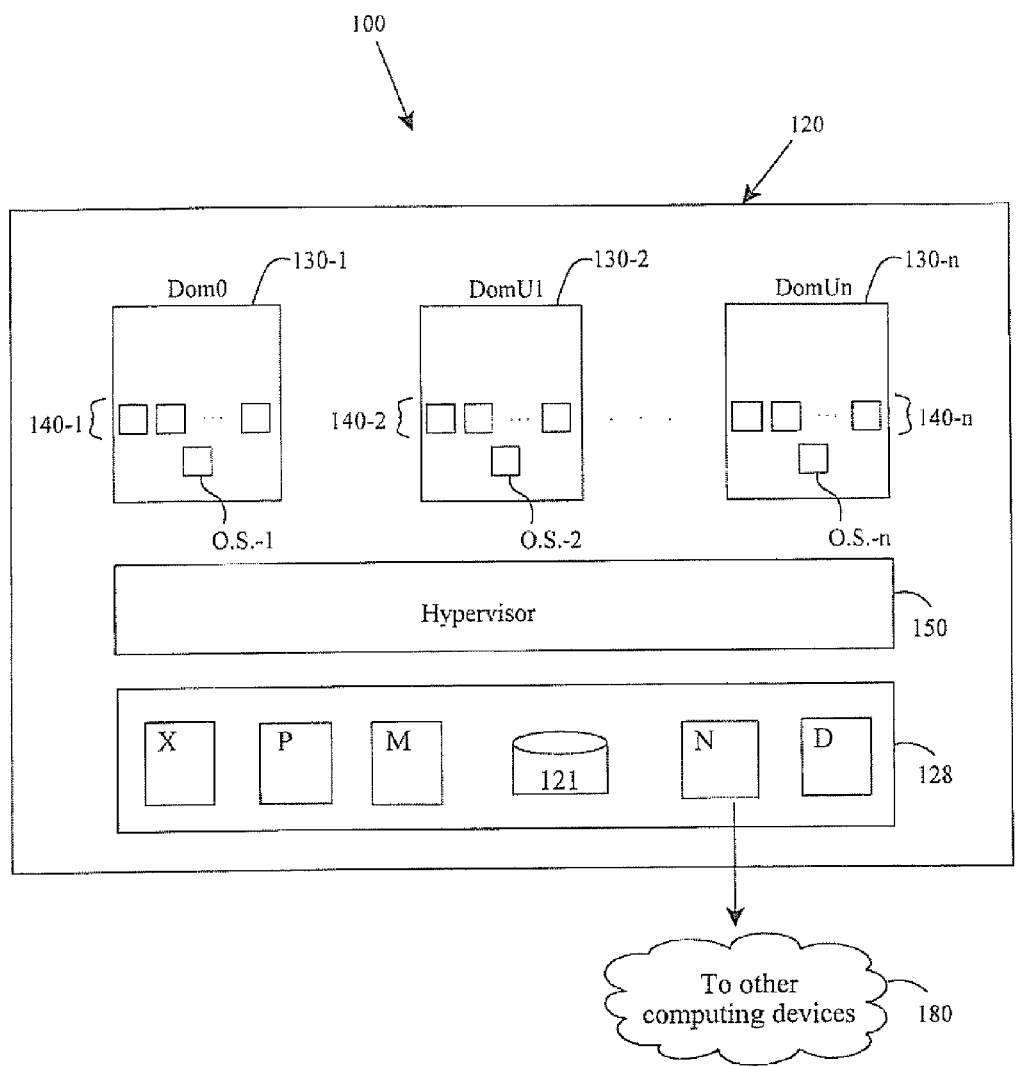
FIG. 83 is a diagram in accordance with the present invention showing a representative computing device for practicing all or some the foregoing.

With reference to FIG. 83, a representative computing system environment 100 includes a computing device 120.

Representatively, the device is a general or special purpose computer, a phone, a PDA, a server, a laptop, etc., having a hardware platform 128. The hardware platform includes physical I/O and platform devices, memory (M), processor (P), such as a CPU(s), USB or other interfaces (X), drivers (D), etc. In turn, the hardware platform hosts one or more virtual machines in the form of domains 130-1 (domain 0, or management domain), 130-2 (domain U1), . . . 130-*n* (domain Un), each having its own guest operating system (O.S.) (e.g., Linux, Windows, Netware, Unix, etc.), applications 140-1, 140-2, . . . 140-*n*, file systems, etc. The workloads of each virtual machine also consume data stored on one or more disks 121.

An intervening Xen or other hypervisor layer 150, also known as a "virtual machine monitor," or virtualization manager, serves as a virtual interface to the hardware and virtualizes the hardware. It is also the lowest and most privileged layer and performs scheduling control between the virtual machines as they task the resources of the hardware platform, e.g., memory, processor, storage, network (N) (by way of network interface cards, for example), etc. The hypervisor also manages conflicts, among other things, caused by operating system access to privileged machine instructions. The hypervisor can also be type 1 (native) or type 2 (hosted). According to various partitions, the operating systems, applications, application data, boot data, or other data, executable instructions, etc., of the machines are virtually stored on the resources of the hardware platform. Alternatively, the computing system environment is not a virtual environment at all, but a more traditional environment lacking a hypervisor, and partitioned virtual domains. Also, the environment could include dedicated services or those hosted on other devices.

In any embodiment, the representative computing device 120 is arranged to communicate 180 with one or more other computing devices or networks. In this regard, the devices may use wired, wireless or combined connections to other devices/networks and may be direct or indirect connections. If direct, they typify connections within physical or network proximity (e.g., intranet). If indirect, they typify connections such as those found with the internet, satellites, radio transmissions, or the like. The connections may also be local area networks (LAN), wide area networks (WAN), metro area networks (MAN), etc., that are presented by way of example and not limitation. The topology is also any of a variety, such as ring, star, bridged, cascaded, meshed, or other known or hereinafter invented arrangement.

In still other embodiments, skilled artisans will appreciate that enterprises can implement some or all of the foregoing with humans, such as system administrators, computing devices, executable code, or combinations thereof. In turn, methods and apparatus of the invention further contemplate computer executable instructions, e.g., code or software, as part of computer program products on readable media, e.g., disks for insertion in a drive of a computing device 120, or available as downloads or direct use from an upstream computing device. When described in the context of such computer program products, it is denoted that items thereof, such as modules, routines, programs, objects, components, data structures, etc., perform particular tasks or implement particular abstract data types within various structures of the computing system which cause a certain function or group of function, and such are well known in the art.

While the foregoing produces a well-compressed output file, e.g., FIG. 69, skilled artisans should appreciate that the algorithm requires relatively considerable processing time to determine a Huffman tree, e.g., element 50, and a dictionary, e.g., element 26, of optimal symbols for use in encoding and compressing an original file. Also, the time spent to determine the key information of the file is significantly longer than the time spent to encode and compress the file with the key. The following embodiment, therefore, describes a technique to use a file's compression byproducts to compress other data files that contain substantially similar patterns. The effectiveness of the resultant compression depends on how similar a related file's patterns are to the original file's patterns. As will be seen, using, previously created, but related key, decreases the processing time to a small fraction of the time needed for the full process above, but at the expense of a slightly less effective compression. The process can be said to achieve a "fast approximation" to optimal compression for the related files.

The definitions from FIG. 1 still apply.

Broadly, the "fast approximation" hereafter 1) greatly reduces the processing time needed to compress a file using the techniques above, and 2) creates and uses a decode tree to identify the most complex possible pattern from an input bit stream that matches previously defined patterns. Similar to earlier embodiments, this encoding method requires repetitive computation that can be automated by computer software. The following discusses the logical processes involved.

Compression Procedure Using a Fast Approximation to Optimal Compression

Instead of using the iterative process of discovery of the optimal set of symbols, above, the following uses the symbols that were previously created for another file that contains patterns significantly similar to those of the file under consideration. In a high-level flow, the process involves the following tasks:

1. Select a file that was previously compressed using the procedure(s) in FIGS. 2-82*b*. The file should contain data patterns that are significantly similar to the current file under consideration for compression.
2. From the previously compressed file, read its key information and unpack its Huffman tree and symbol dictionary by using the procedure described above, e.g., FIGS. 63-82*b*.
3. Create a decode tree for the current file by using the symbol dictionary from the original file.
4. Identify and count the number of occurrences of patterns in the current file that match the previously defined patterns.
5. Create a Huffman encoding tree for the symbols that occur in the current file plus an end-of-file (EOF) symbol.
6. Store the information using the Huffman tree for the current file plus the file type, symbol width, and dictionary from the original file.

Each of the tasks is described in more detail below. An example is provided thereafter.

Selecting a Previously Compressed File

The objective of the fast approximation method is to take advantage of the key information in an optimally compressed file that was created by using the techniques above. In its uncompressed form of original data, the compressed file should contain data patterns that are significantly similar to the patterns in the current file under consideration for compression. The effectiveness of the resultant compression depends on how similar a related file's patterns are to the original file's patterns. The way a skilled artisan recognizes a similar file is that similar bit patterns are found in the originally compressed and new file yet to be compressed. It can be theorized a priori that files are likely similar if they have similar formatting (e.g., text, audio, image, powerpoint, spreadsheet, etc), topic content, tools used to create the files, file type, etc. Conclusive evidence of similar bit patterns is that similar compression ratios will occur on both files (i.e. original file compresses to 35% of original size, while target file also compresses to about 35% of original size). It should be noted that similar file sizes are not a requisite for similar patterns being present in both files.

Figure 84:
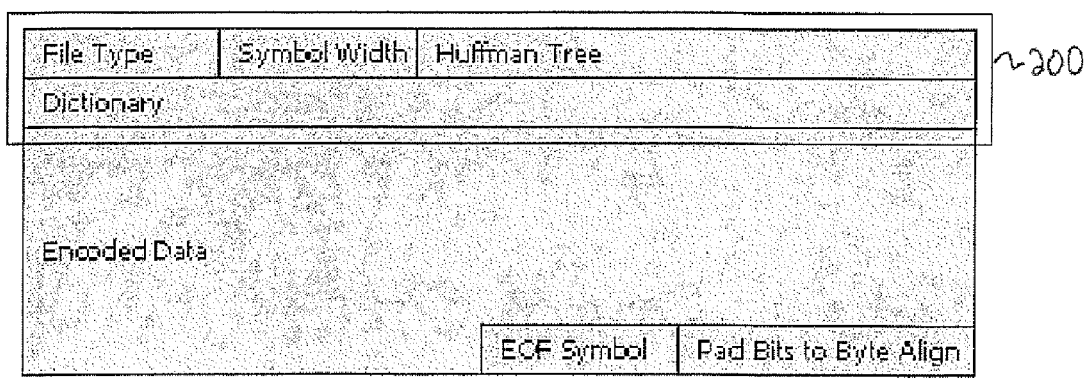

With reference to FIG. 84, the key information 200 of a file includes the file type, symbol width, Huffman tree, and dictionary from an earlier file, e.g., file 69, FIG. 69.

Reading and Unpacking the Key Information

From the key information 200, read and unpack the File Type, Maximum Symbol Width, Huffman Tree, and Dictionary fields.

Creating a Decode Tree for the Current File

Create a pattern decode tree using the symbol dictionary retrieved from the key information. Each symbol represents a bit pattern from the original data stream. We determine what those bits are by building a decode tree, and then parsing the tree to read the bit patterns for each symbol.

We use the tuples that are defined in the re-constructed dictionary to build the decode tree. The pattern decode tree is formed as a tree that begins at the root and branches downward. A terminal node represents a symbol ID value. A transition node is a placeholder for a bit that leads to terminal nodes.

Identifying and Counting Pattern Occurrences

Read the bit stream of the current file one bit at a time. As the data stream is parsed from left to right, the paths in the decode tree are traversed to detect patterns in the data that match symbols in the original dictionary.

Starting from the root of the pattern decode tree, use the value of each input bit to determine the descent path thru the pattern decode tree. A "0" indicates a path down and to the left, while a "1" indicates a path down and to the right. Continue descending through the decode tree until there is no more descent path available. This can occur because a branch left is indicated with no left branch available, or a branch right is indicated with no right branch available.

When the end of the descent path is reached, one of the following occurs:

If the descent path ends in a terminal node, count the symbol ID found there.

If the descent path ends in a transition node, retrace the descent path toward the root, until a terminal node is encountered. This terminal node represents the most complex pattern that could be identified in the input bit stream. For each level of the tree ascended, replace the bit that the path represents back into the bit stream because those bits form the beginning of the next pattern to be discovered. Count the symbol ID found in the terminal node.

Return to the root of the decode tree and continue with the next bit in the data stream to find the next symbol.

Repeat this process until all of the bits in the stream have been matched to patterns in the decode tree. When done, there exists a list of all of the symbols that occur in the bit stream and the frequency of occurrence for each symbol.

Creating a Huffman Tree and Code for the Current File

Use the frequency information to create a Huffman encoding tree for the symbols that occur in the current file. Include the end-of-file (EOF) symbol when constructing the tree and determining the code.

Storing the Compressed File

Use the Huffman tree for the current file to encode its data. The information needed to decompress the file is written at the front of the compressed file, as well as to a separate dictionary only file. The compressed file contains:

The file type and maximum symbol width information from the original file's key

A coded representation of the Huffman tree that was created for the current file and used to compress its data, The dictionary of symbols from the original file's key.

The Huffman-encoded data, and

The Huffman-encoded EOF symbol.

Example of "Fast Approximation"

This example uses the key information 200 from a previously created but related compressed file to approximate the symbols needed to compress a different file.

Reading and Unpacking the Key Information

With reference to table 202, FIG. 85, a representative dictionary of symbols (0-8) was unpacked from the key information 200 for a previously compressed file. The symbols 0 and 1 are atomic, according to definition (FIG. 1) in that they represent bits 0 and 1, respectively. The reading and unpacking this dictionary from the key information is given above.

Construct the Decode Tree from the Dictionary

Figure 86:
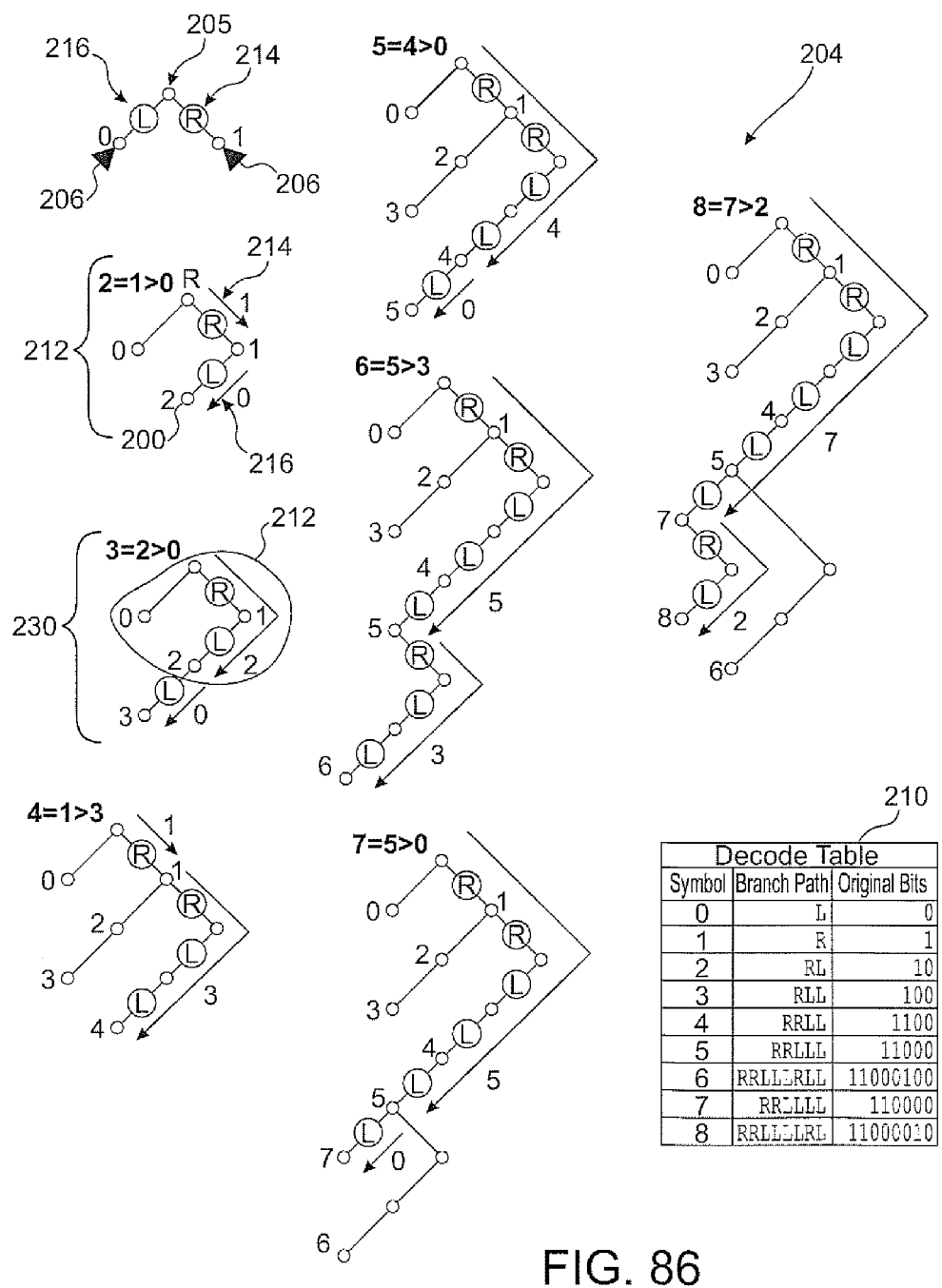

With reference to FIG. 86, a diagram 204 demonstrates the process of building the decode tree for each of the symbols in the dictionary (FIG. 85) and determining the original bits represented by each of the symbols in the dictionary. In the decode tree, there are also terminal nodes, e.g., 205, and transition nodes, e.g., 206. A terminal node represents a symbol value. A transition node does not represent a symbol, but represents additional bits in the path to the next symbol. The step-by-step reconstruction of the original bits is described below.

Start with symbols 0 and 1. These are the atomic elements, by definition, so there is no related tuple as in the dictionary of FIG. 85. The symbol 0 branches left and down from the root. The symbol 1 branches right and down from the root. (Left and right are relative to the node as you are facing the diagram—that is, on your left and on your right.) The atomic elements are each represented by a single bit, so the binary path and the original path are the same. You record the "original bits" 0 and 1 in the decode table 210, as well as its "branch path."

Symbol 2 is defined from the dictionary as the tuple 1>0 (symbol 1 followed by symbol 0). In the decode tree 212, go to the node for symbol 1 (which is transition node 205 followed by a right path R and ending in a terminal node 206, or arrow 214), then add a path that represents symbol 0 (which is transition node 205 followed by a left path L and ending in a terminal node 206, or path 216). That is, you add a left branch at node 1. The terminating node 220 is the symbol 2. Traverse the path from the root to the leaf to read the branch paths of right (R) and left (L). Replace each left branch with a 0 and each right path with a 1 to view the binary form of the path as RL, or binary 10 as in decode table 210.

Symbol 3 is defined as the tuple 2>0. In its decode tree 230, it is the same as the decode tree for symbol 2, which is decode tree 212, followed by the "0." Particularly, in tree 230, go to the node for symbol 2, then add a path that represents symbol 0. That is, you add a left branch (e.g., arrow 216) at node 2. The terminating node is the symbol 3. Traverse the path from the root to the leaf to read the branch path of RLL. Replace each left branch with a 0 and each right path with a 1 to view the binary format of 100 as in the decode table.

Similarly, the other symbols are defined with decode trees building on the decode trees for other symbols. In particular, they are as follows:

Symbol 4 from the dictionary is defined as the tuple 1>3. In its decode tree, go to the node for symbol 1, then add a path that represents symbol 3. From the root to the node for symbol 3, the path is RLL. At symbol 1, add the RLL path. The terminating node is symbol 4. Traverse the path from the root to the leaf to read the path of RRLL, which translates to the binary format of 1100 as in the decode table.

Symbol 5 is defined as the tuple 4>0. In its decode tree, go to the node for symbol 4, then add a path that represents symbol 0. At symbol 4, add the L path. The terminating node is symbol 5. Traverse the path from the root to the leaf to read the path of RRLLL, which translates to the binary format of 11000.

Symbol 6 is defined as the tuple 5>3. In its decode tree, go to the node for symbol 5, then add a path that represents symbol 3. The terminating node is symbol 6. Traverse the path from the root to the leaf to read the path of RRLLLRLL, which translates to the binary format of 11000100.

Symbol 7 is defined from the dictionary as the tuple 5>0. In its decode tree, go to the node for symbol 5, then add a path that represents symbol 0. From the root to the node for symbol 5, the path is RRLLL. Add a left branch. The terminating node is symbol 7. Traverse the path from the root to the leaf to read the path of RRLLLL, which translates to the binary format of 110000.

Finally, symbol 8 is defined in the dictionary as the tuple 7>2. In its decode tree, go to the node for symbol 7, then add a path that represents symbol 2. From the root to the node for symbol 7, the path is RRLLLLL. Add a RL path for symbol 2. The terminating node is symbol 8. Traverse the path from the root to the leaf to read the path of RRLLLLRL, which translates to the binary format of 11000010.

Figure 87:
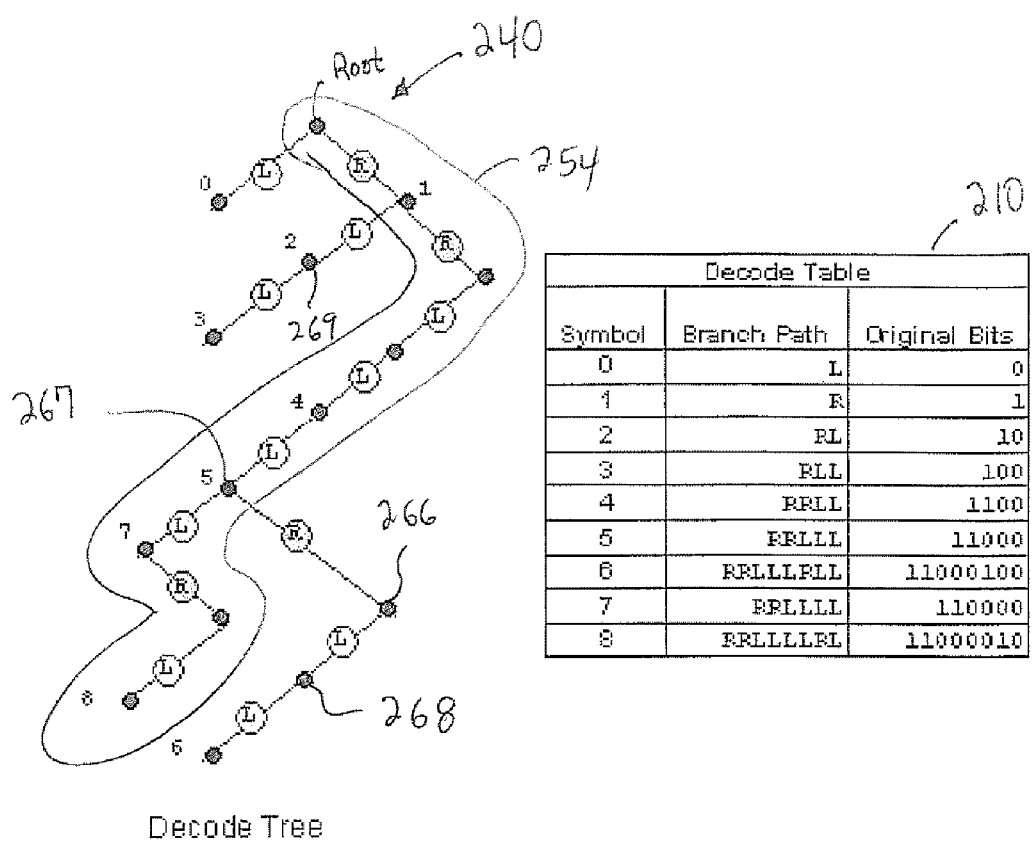

The final decode tree for all symbols put together in a single tree is element 240, FIG. 87, and the decode table 210 is populated with all original bit and branch path information.
Identifying and Counting Pattern Occurrences For this example, the sample or "current file" to be compressed is similar to the one earlier compressed who's key information 200, FIG. 84, was earlier extracted. It contains the following representative "bit stream" (reproduced in FIG. 88, with spaces for readability):
011000010110001001100001011000100110000101100001011000100110000101100010
011000010110000101100010011000010110001001100001011000100110000101100010
011000100110000101100010 0110000101100010

Figure 88:
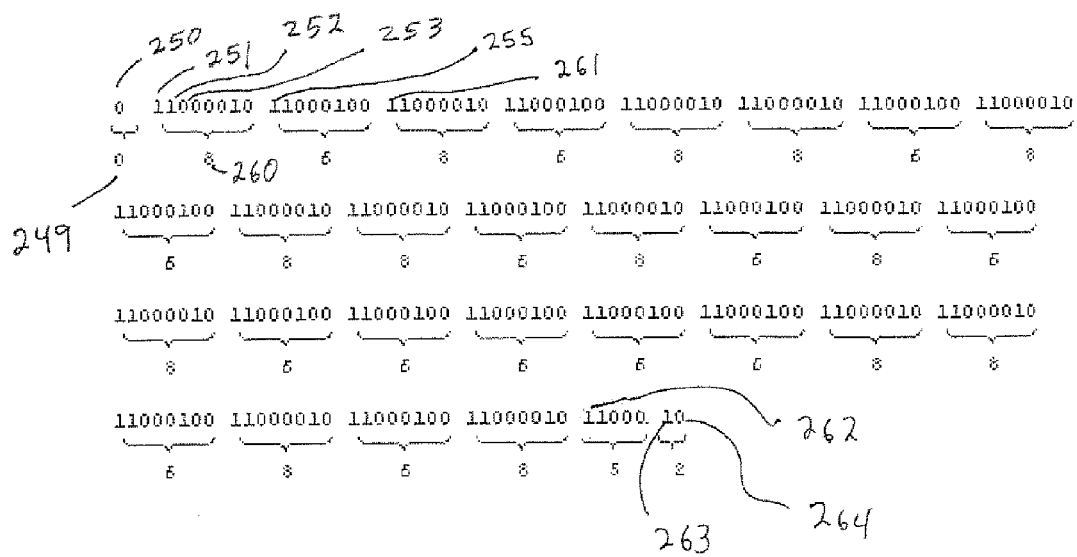

We step through the stream one bit at a time to match patterns in the stream to the known symbols from the dictionary 200, FIG. 85. To determine the next pattern in the bit stream, we look for the longest sequence of bits that match a known symbol. To discover symbols in the new data bit stream, read a single bit at a time from the input bit stream. Representatively, the very first bit, 250 FIG. 88, of the bit stream is a "0." With reference to the Decode Tree, 240 in FIG. 87, start at the top-most (the root) node of the tree. The "0" input bit indicates a down and left "Branch Path" from the root node. The next bit from the source bit stream at position 251 in FIG. 88, is a "1," indicating a down and right path. The Decode Tree does not have a defined path down and right from the current node. However the current node is a terminal node, with a symbol ID of 0. Write a symbol 0 to a temporary file, and increment the counter corresponding to symbol ID 0. Return to the root node of the Decode Tree, and begin looking for the next symbol. The "1" bit that was not previously usable in the decode (e.g., 251 in FIG. 88) indicates a down and right. The next bit "1" (252 in FIG. 88) indicates a down and right. Similarly, subsequent bits "000010" indicate further descents in the decode tree with paths directions of LLLLRL, resulting in path 254 from the root. The next bit "1" (position 255, FIG. 88) denotes a further down and right path, which does not exist in the decode tree 240, as we are presently at a terminal node. The symbol ID for this terminal node is 8. Write a symbol 8 to the temporary file, and increment the counter corresponding to symbol ID 8.

Return to the root node of the Decode Tree, and begin looking for the next symbol again starting with the last unused input stream bit, e.g., the bit "1" at position 255, FIG. 88. Subsequent bits in the source bit stream, "11000100," lead down through the Decode Tree to a terminal node for symbol 6. The next bit, "1", at position 261, FIG. 88, does not represent a possible down and right traversal path. Thus, write a symbol 6 to the temporary file, and increment the counter corresponding to symbol ID 6. Again, starting back at the root of the tree, perform similar decodes and book keeping to denote discovery of symbols 868868686866666886868. Starting again at the root of the Decode Tree, parse the paths represented by input bits "1100010" beginning at position 262. There are no more bits available in the input stream. However, the current position in the Decode Tree, position 268, does not identify a known symbol. Thus, retrace the Decode Tree path upward toward the root. On each upward level node transition, replace a bit at the front of the input bit stream with a bit that represents that path transition; e.g. up and right is a "0", up and left is a "1". Continue the upward parse until reaching a valid symbol ID node, in this case the node 267 for symbol ID 5. In the process, two bits (e.g., positions 263 and 264, FIG. 88) will have been pushed back onto the input stream, a "0", and then a "1." As before, write a symbol 5 to a temporary file, and increment the counter corresponding to symbol ID 5. Starting back at the root of the tree, bits are pulled from the input stream and parsed downward, in this case the "1" and then the "0" at positions 263 and 264. As we are now out of input bits, after position 264, examine the current node for a valid symbol ID, which in this case does exist at node 269, a symbol ID of 2. Write a symbol 2 to the temporary files, increment the corresponding counter. All input bits have now been decoded to previously defined symbols. The entire contents of the temporary file are symbols: "08686886868686868686666688686852."

Figure 90:
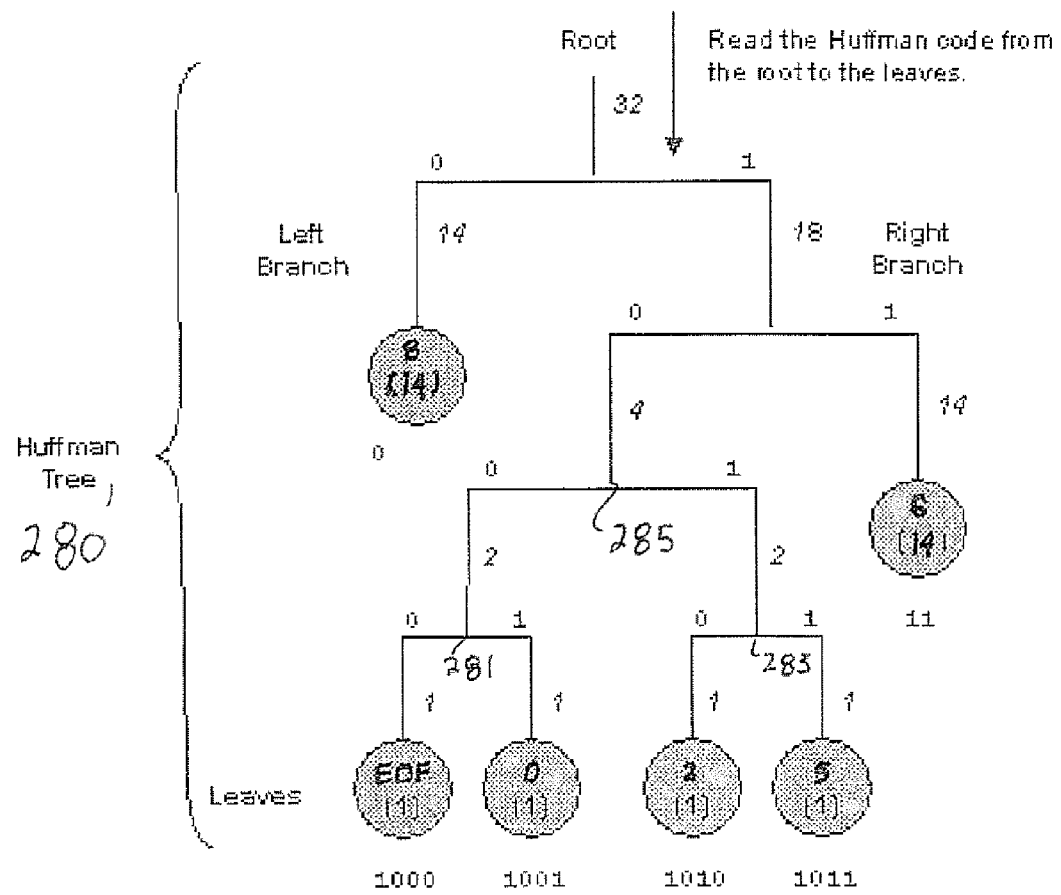

From here, the frequency of occurrence of each of the symbols in the new bit stream is counted. For example, the symbols "0" and 2" are each found occurring once at the beginning and end of the new bit stream. Similarly, the symbol "5" is counted once just before the symbol "2." Each of the symbols "6" and "8" are counted fourteen times in the middle of the new bit stream for a total of thirty-one symbols. Its result is shown in table 275, FIG. 89. Also, one count for the end of file (EOF) symbol is added that is needed to mark the end of the encoded data when we store the compressed data.
Creating a Huffman Tree and Code for the Current File From the symbol "counts" in FIG. 89, a Huffman binary code tree 280 is built for the current file, as seen in FIG. 90. There is no Huffman code assigned to the symbol 1, symbol 3, symbol 4, and symbol 7 because there are no instances of these symbols in the new bit stream. However, the extinct symbols will be needed in the decode table for the tree. The reason for this is that a complex symbol may decode to two less complex symbols. For example, it is known that a symbol 8 decodes to tuple 7>2, e.g., FIG. 85.

To construct the tree 280, list first the symbols from highest count to lowest count. In this example, the symbol "8" and symbol "6" tied with a count of fourteen and are each listed highest on the tree. On the other hand, the least counted symbols were each of symbol "0," "2," "5," and the EOF. Combine the counts for the two least frequently occurring symbols in the dictionary. This creates a node that has the value of the sum of the two counts. In this example, the EOF and 0 are combined into a single node 281 as are the symbols 2 and 5 at node 283. Together, all four of these symbols combine into a node 285. Continue combining the two lowest counts in this manner until there is only one symbol remaining. This generates a Huffman binary code tree.

Label the code tree paths with zeros (0s) and ones (1s). To encode a symbol, parse from the root to the symbol. Each left and down path represents a 0 in the Huffman code. Each right and down path represents a 1 in the Huffman code. The Huffman coding scheme assigns shorter code words to the more frequent symbols, which helps reduce the size length of the encoded data. The Huffman code for a symbol is defined as the string of values associated with each path transition from the root to the symbol terminal node.

With reference to FIG. 91, table 290 shows the final Huffman code for the current file, as based on the tree. For example, the symbol "8" appears with the Huffman code 0. From the tree, and knowing the rule that "0" is a left and down path, the "8" should appear from the root at down and left, as it does. Similarly, the symbol "5" should appear at "1011" or right and down, left and down, right and down, and right and down, as it does. Similarly, the other symbols are found. There is no code for symbols 1, 3, 4, and 7, however, because they do not appear in the current file.

Storing the Compressed File

Figure 92:
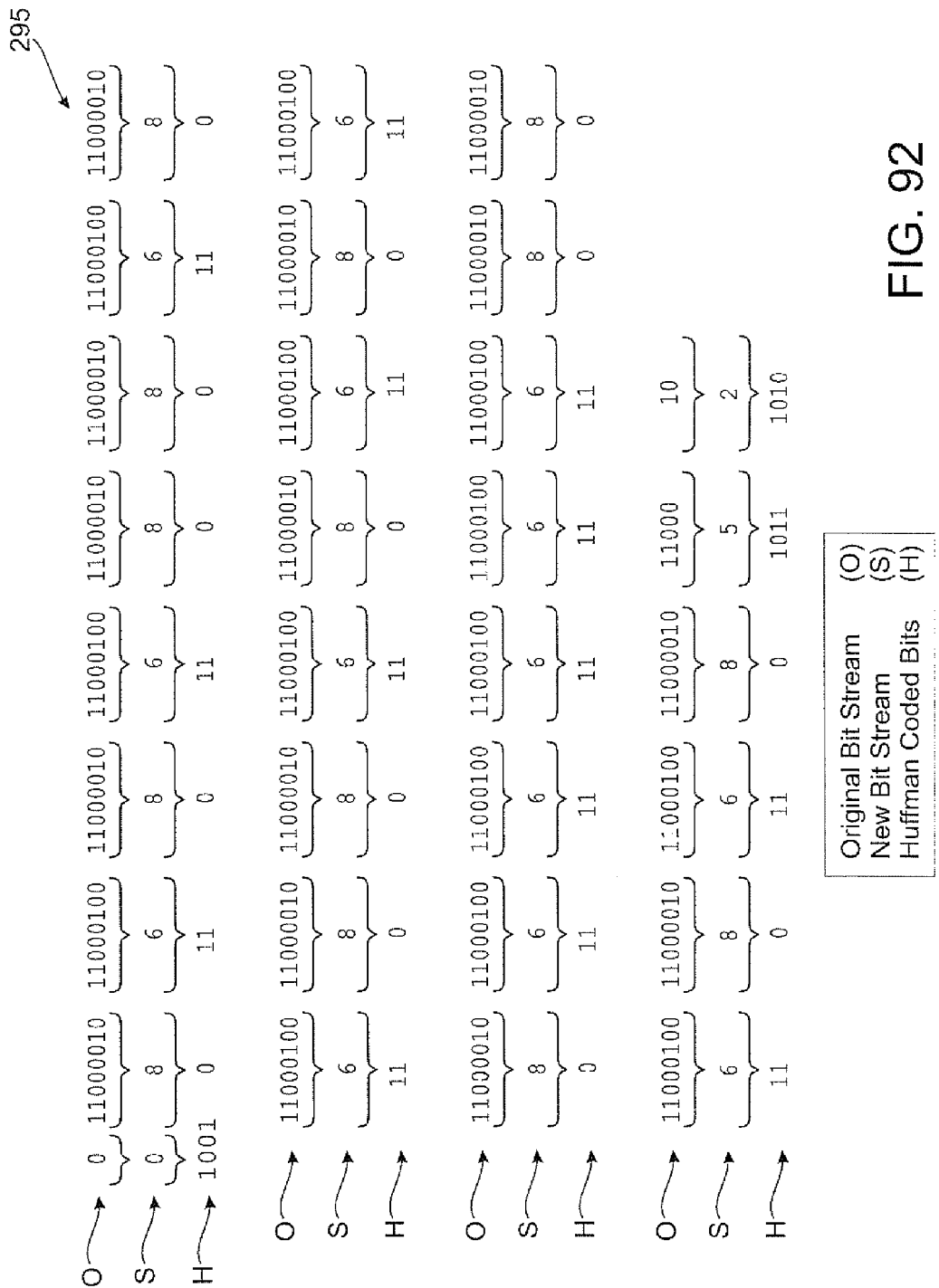

The diagram in FIG. 92 illustrates how we now replace the symbols with their Huffman code value when the file is stored, such as in file format element 69, FIG. 69. As is seen, the diagram 295 shows the original bit stream that is coded to symbols or a new bit stream, then coded to Huffman codes. For example, the "0" bit at position 250 in the original bit stream coded to a symbol "0" as described in FIG. 88. By replacing the symbol 0 with its Huffman code (1001) from table 290, FIG. 91, the Huffman encoded bits are seen, as:

1001 0 11 0 11 0 0 11 0 11 0 0 11 0 11 0 11 0 11 11 11 11 11 0 0 11 0 11 0 1011 1010 <u>1000</u>

Spaces are shown between the coded bits for readability; the spaces are not written to media. Also, the code for the EOF symbol (1000) is placed at the end of the encoded data and shown in underline.

With reference to FIG. 93, the foregoing information is stored in the compressed file 69' for the current file. As skilled artisans will notice, it includes both original or reused information and new information, thereby resulting in a "fast approximation." In detail, it includes the file type from the original key information (200), the symbol width from the original key information (200), the new Huffman coding recently created for the new file, the dictionary from the key information (200) of the original file, the data that is encoded by using the new Huffman tree, and the new EOF symbol. After the EOF symbol, a variable amount of pad bits are added to align the data with the final byte in storage.

The foregoing has been described in terms of specific embodiments, but one of ordinary skill in the art will recognize that additional embodiments are possible without departing from its teachings. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of the other figures.

What is claimed is:

1. In a computing system environment, a method of compressing new data from a new file, comprising:
   extracting key compression/decompression information from an earlier compressed file having original data with bit patterns determined to be similar to bit patterns of the new data of the new file; and
   encoding the new data based on the extracted key information,
   wherein the extracting key compression/decompression information from the earlier compressed file includes extracting a dictionary, the dictionary having defined symbols representing the original data.

2. In a computing system environment, a method of compressing new data of a new file, comprising:
   obtaining a dictionary defining all symbols representing compressed original bits of data from an earlier compressed file having original data with bit patterns determined to be similar to
   bit patterns of the new data of the new file; and
   encoding the new data based thereon,
   wherein the encoding further includes determining original bits corresponding to all symbols in the dictionary, the earlier compressed file having the original data arranged as a plurality of symbols,
   identifying sequences of the original bits in the new data of the new file,
   wherein the identifying sequences further includes identifying longest possible sequences of the original bits in the new data of the new file,
   creating a new bit stream of symbols representing the identified sequences of the original bits,
   counting occurrences of every symbol in the new bit stream,
   creating a Huffman encoding in bits from the counted occurrences,
   storing the bits in a compressed current file, the compressed current file also including the dictionary from the earlier compressed file having original data similar to the new data of the new file.

\* \* \* \* \*